(12) United States Patent
Davis

(10) Patent No.: US 8,345,979 B2
(45) Date of Patent: *Jan. 1, 2013

(54) METHODS FOR FINDING AND CHARACTERIZING A DEFORMED PATTERN IN AN IMAGE

(75) Inventor: Jason Davis, Bellingham, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/670,199

(22) Filed: Feb. 1, 2007

(65) Prior Publication Data
US 2007/0183668 A1    Aug. 9, 2007

Related U.S. Application Data

(63) Continuation of application No. 10/625,205, filed on Jul. 22, 2003.

(51) Int. Cl.
*G06K 9/00* (2006.01)
*G06K 9/46* (2006.01)

(52) U.S. Cl. ......................... 382/181; 382/191

(58) Field of Classification Search .............. 382/151, 382/173, 177, 181, 190, 191, 194, 195, 197, 382/199, 217, 218, 291, 294–296, 321; 345/467; 381/408; 235/494
See application file for complete search history.

(56) References Cited

U.S. PATENT DOCUMENTS

| | | |
|---|---|---|
| 3,069,654 A | 12/1962 | Hough |
| 3,560,930 A | 2/1971 | Howard |
| 3,816,722 A | 6/1974 | Sakoe et al. |
| 3,898,617 A | 8/1975 | Kashioka et al. |
| 3,899,240 A | 8/1975 | Gabor |
| 3,899,771 A | 8/1975 | Saraga et al. |
| 3,936,800 A | 2/1976 | Ejiri et al. |

(Continued)

FOREIGN PATENT DOCUMENTS

JP         06-160047         6/1994

(Continued)

OTHER PUBLICATIONS

Gdalyahu, Yoram et al., "Self-Organization in Vision: Stochastic Clustering for Image Segmentation, Perceptual Grouping, and Image Database Organization", *IEEE Transactions on Pattern Analysis and Machine Intelligence*, IEEE Inc., New York, US, vol. 23, No. 10, Oct. 2001, 1053-1074.

(Continued)

*Primary Examiner* — Kanji Patel

(57) ABSTRACT

A method is disclosed for finding a deformed pattern in an image using a plurality of sub-patterns. By advantageously restricting sub-pattern search ranges, search speed is improved, and the incidence of spurious matches is reduced. The method also quickly decides which sub-pattern result, of several potential candidates, is most likely to be the correct match for a deformed sub-pattern. Also, a method is provided for characterizing a deformed pattern in an image by using results from feature-based search tools to create a mapping that models the deformation of the pattern. A transform, selectable by a user, is fit to the results from the search tools to create a global deformation mapping. This transformation is fit only to feature points derived from matches resulting from successful sub-pattern search, without including data from areas of the pattern that were blank, not matched, or otherwise didn't contain information about the pattern's distorted location.

21 Claims, 10 Drawing Sheets

U.S. PATENT DOCUMENTS

| | | |
|---|---|---|
| 3,986,007 A | 10/1976 | Ruoff |
| 4,115,702 A | 9/1978 | Nopper |
| 4,115,762 A | 9/1978 | Akiyama |
| 4,146,924 A | 3/1979 | Birk et al. |
| 4,183,013 A | 1/1980 | Agrawala et al. |
| 4,200,861 A | 4/1980 | Hubach et al. |
| 4,213,150 A | 7/1980 | Robinson et al. |
| 4,295,198 A | 10/1981 | Copeland et al. |
| 4,441,205 A | 4/1984 | Berkin et al. |
| 4,441,206 A | 4/1984 | Kuniyoshi et al. |
| 4,441,248 A | 4/1984 | Sherman et al. |
| 4,567,610 A | 1/1986 | McConnell |
| 4,570,180 A | 2/1986 | Baier et al. |
| 4,581,762 A | 4/1986 | Lapidus et al. |
| 4,618,989 A | 10/1986 | Tsukune et al. |
| 4,637,055 A | 1/1987 | Taylor |
| 4,651,341 A | 3/1987 | Nakashima et al. |
| 4,672,676 A | 6/1987 | Linger |
| 4,675,833 A * | 6/1987 | Cheek et al. .................. 345/468 |
| 4,685,143 A | 8/1987 | Choate |
| 4,688,088 A | 8/1987 | Hamazaki et al. |
| 4,707,647 A | 11/1987 | Coldrenet et al. |
| 4,736,437 A | 4/1988 | Sacks et al. |
| 4,763,280 A | 8/1988 | Robinson et al. |
| 4,783,826 A | 11/1988 | Koso |
| 4,783,829 A | 11/1988 | Miyakawa et al. |
| 4,799,175 A | 1/1989 | Sano et al. |
| 4,809,348 A | 2/1989 | Meyer et al. |
| 4,823,394 A | 4/1989 | Berkin et al. |
| 4,843,631 A | 6/1989 | Steinpichler et al. |
| 4,845,765 A | 7/1989 | Juvin et al. |
| 4,849,914 A | 7/1989 | Medioni et al. |
| 4,860,374 A | 8/1989 | Murakami et al. |
| 4,876,457 A | 10/1989 | Bose |
| 4,876,728 A | 10/1989 | Roth |
| 4,893,346 A | 1/1990 | Bishop |
| 4,903,312 A * | 2/1990 | Sato .............................. 382/170 |
| 4,903,313 A * | 2/1990 | Tachikawa .................... 382/171 |
| 4,922,543 A | 5/1990 | Ahlborn et al. |
| 4,955,062 A | 9/1990 | Terui |
| 4,959,898 A | 10/1990 | Landman et al. |
| 4,972,359 A | 11/1990 | Silver et al. |
| 4,979,223 A | 12/1990 | Manns et al. |
| 4,980,971 A | 1/1991 | Bartschat et al. |
| 5,003,166 A | 3/1991 | Girod |
| 5,020,006 A | 5/1991 | Sporon-Fiedler |
| 5,027,417 A | 6/1991 | Kitakado et al. |
| 5,033,099 A | 7/1991 | Yamada et al. |
| 5,040,231 A | 8/1991 | Terzian |
| 5,046,109 A | 9/1991 | Fujimori et al. |
| 5,048,094 A | 9/1991 | Aoyama et al. |
| 5,054,094 A * | 10/1991 | Barski ........................... 382/192 |
| 5,060,276 A | 10/1991 | Morris et al. |
| 5,072,384 A | 12/1991 | Doi et al. |
| 5,086,478 A | 2/1992 | Kelly-Mahaffey et al. |
| 5,093,867 A | 3/1992 | Hori et al. |
| 5,111,516 A | 5/1992 | Nakano et al. |
| 5,113,565 A | 5/1992 | Cipolla et al. |
| 5,161,201 A | 11/1992 | Kaga et al. |
| 5,168,530 A | 12/1992 | Peregrim et al. |
| 5,177,559 A | 1/1993 | Bachelder et al. |
| 5,206,917 A | 4/1993 | Ueno et al. |
| 5,226,095 A | 7/1993 | Okumura et al. |
| 5,245,674 A | 9/1993 | Cass et al. |
| 5,253,306 A | 10/1993 | Nishio |
| 5,268,999 A | 12/1993 | Yokoyama |
| 5,272,657 A | 12/1993 | Basehore et al. |
| 5,280,351 A | 1/1994 | Wilkinson |
| 5,313,532 A | 5/1994 | Harvey et al. |
| 5,343,028 A | 8/1994 | Figarella et al. |
| 5,343,390 A | 8/1994 | Doi et al. |
| 5,347,595 A | 9/1994 | Bokser |
| 5,351,310 A | 9/1994 | Califano et al. |
| 5,371,690 A | 12/1994 | Engel et al. |
| 5,384,711 A | 1/1995 | Kanai et al. |
| 5,398,292 A | 3/1995 | Aoyama |
| 5,406,642 A | 4/1995 | Maruya |
| 5,459,636 A | 10/1995 | Gee et al. |
| 5,471,541 A | 11/1995 | Burtnyk et al. |
| 5,481,712 A | 1/1996 | Silver et al. |
| 5,495,537 A | 2/1996 | Bedrosian et al. |
| 5,497,451 A | 3/1996 | Holmes |
| 5,500,906 A | 3/1996 | Picard et al. |
| 5,506,942 A * | 4/1996 | Mikuni et al. ................ 358/1.11 |
| 5,513,275 A | 4/1996 | Khalaj et al. |
| 5,515,453 A | 5/1996 | Hennessey et al. |
| 5,524,064 A | 6/1996 | Oddou et al. |
| 5,537,669 A | 7/1996 | Evans et al. |
| 5,539,841 A | 7/1996 | Huttenlocher et al. |
| 5,544,254 A | 8/1996 | Hartley et al. |
| 5,545,887 A | 8/1996 | Smith et al. |
| 5,548,326 A | 8/1996 | Michael |
| 5,550,763 A | 8/1996 | Michael et al. |
| 5,550,937 A | 8/1996 | Bell et al. |
| 5,555,317 A | 9/1996 | Anderson |
| 5,555,320 A | 9/1996 | Irie et al. |
| 5,557,684 A | 9/1996 | Wang et al. |
| 5,559,901 A | 9/1996 | Lobregt |
| 5,568,563 A | 10/1996 | Tanaka et al. |
| 5,570,430 A | 10/1996 | Sheehan et al. |
| 5,586,058 A | 12/1996 | Aloni et al. |
| 5,602,937 A | 2/1997 | Bedrosian et al. |
| 5,602,938 A | 2/1997 | Akiyama et al. |
| 5,613,013 A | 3/1997 | Schuette |
| 5,621,807 A | 4/1997 | Eibert et al. |
| 5,623,560 A | 4/1997 | Nakajima et al. |
| 5,625,707 A | 4/1997 | Diep et al. |
| 5,625,715 A | 4/1997 | Trew et al. |
| 5,627,912 A | 5/1997 | Matsumoto |
| 5,627,915 A | 5/1997 | Rosser et al. |
| 5,631,975 A | 5/1997 | Riglet et al. |
| 5,633,951 A | 5/1997 | Moshfeghi |
| 5,638,116 A | 6/1997 | Shimoura et al. |
| 5,638,489 A | 6/1997 | Tsuboka |
| 5,640,200 A | 6/1997 | Michael |
| 5,650,828 A | 7/1997 | Lee |
| 5,657,403 A | 8/1997 | Wolff et al. |
| 5,663,809 A | 9/1997 | Miyaza et al. |
| 5,673,334 A | 9/1997 | Nichani et al. |
| 5,676,302 A | 10/1997 | Petry |
| 5,686,973 A | 11/1997 | Lee |
| 5,694,482 A | 12/1997 | Maali et al. |
| 5,694,487 A | 12/1997 | Lee |
| 5,703,960 A | 12/1997 | Soest |
| 5,703,964 A | 12/1997 | Menon et al. |
| 5,708,731 A | 1/1998 | shmotori et al. |
| 5,717,785 A | 2/1998 | Silver |
| 5,754,226 A | 5/1998 | Yamada et al. |
| 5,757,956 A | 5/1998 | Koljonen et al. |
| 5,768,421 A | 6/1998 | Gaffin et al. |
| 5,793,901 A | 8/1998 | Matsutake et al. |
| 5,796,868 A | 8/1998 | Dutta-Choudhury et al. |
| 5,815,198 A | 9/1998 | Vachtsevanos et al. |
| 5,822,742 A | 10/1998 | Alkon et al. |
| 5,825,913 A | 10/1998 | Rostami et al. |
| 5,825,922 A | 10/1998 | Pearson et al. |
| 5,828,769 A | 10/1998 | Burns |
| 5,828,770 A | 10/1998 | Leis et al. |
| 5,835,622 A | 11/1998 | Koljonen et al. |
| 5,845,007 A | 12/1998 | Ohashi et al. |
| 5,845,288 A | 12/1998 | Syeda-Mahmood |
| 5,848,184 A | 12/1998 | Taylor et al. |
| 5,848,189 A | 12/1998 | Pearson et al. |
| 5,850,466 A | 12/1998 | Schott et al. |
| 5,850,469 A | 12/1998 | Martin et al. |
| 5,859,923 A | 1/1999 | Petry, III et al. |
| 5,862,245 A | 1/1999 | Renouard et al. |
| 5,864,779 A | 1/1999 | Fujimoto |
| 5,871,018 A | 2/1999 | Delp et al. |
| 5,875,040 A | 2/1999 | Matraszek et al. |
| 5,881,170 A | 3/1999 | Araki et al. |
| 5,890,808 A | 4/1999 | Neff et al. |
| 5,912,984 A | 6/1999 | Michael et al. |
| 5,912,985 A | 6/1999 | Morimoto et al. |
| 5,917,733 A | 6/1999 | Bangham |
| 5,917,962 A * | 6/1999 | Chen et al. .................... 382/291 |

| | | |
|---|---|---|
| 5,926,568 A | 7/1999 | Chaney et al. |
| 5,930,391 A | 7/1999 | Kinjo |
| 5,933,516 A | 8/1999 | Tu et al. |
| 5,933,523 A | 8/1999 | Drisko et al. |
| 5,937,084 A | 8/1999 | Crabtree et al. |
| 5,940,535 A | 8/1999 | Huang |
| 5,943,442 A | 8/1999 | Tanaka |
| 5,950,158 A | 9/1999 | Wang |
| 5,974,169 A | 10/1999 | Bachelder |
| 5,974,365 A | 10/1999 | Mitchell |
| 5,982,475 A | 11/1999 | Bruning et al. |
| 5,987,172 A | 11/1999 | Michael |
| 5,995,648 A | 11/1999 | Drisko et al. |
| 5,995,953 A | 11/1999 | Rindtorff et al. |
| 6,002,793 A | 12/1999 | Silver et al. |
| 6,005,978 A | 12/1999 | Garakani |
| 6,021,220 A | 2/2000 | Anderholm |
| 6,023,530 A | 2/2000 | Wilson |
| 6,026,186 A | 2/2000 | Fan |
| 6,026,359 A | 2/2000 | Yamaguchi et al. |
| 6,035,006 A | 3/2000 | Matui |
| 6,035,066 A | 3/2000 | Michael |
| 6,052,489 A | 4/2000 | Sakaue |
| 6,061,086 A | 5/2000 | Reimer et al. |
| 6,064,388 A | 5/2000 | Reyzin |
| 6,064,958 A | 5/2000 | Takahashi et al. |
| 6,067,379 A | 5/2000 | Silver |
| 6,070,160 A | 5/2000 | Geary et al. |
| 6,078,700 A | 6/2000 | Sarachik |
| 6,081,620 A | 6/2000 | Anderholm |
| 6,111,984 A | 8/2000 | Fukasawa |
| 6,115,052 A | 9/2000 | Freeman et al. |
| 6,118,893 A | 9/2000 | Li |
| 6,122,399 A | 9/2000 | Moed |
| 6,128,405 A | 10/2000 | Fujii |
| 6,130,959 A | 10/2000 | Li |
| 6,137,893 A | 10/2000 | Michael et al. |
| 6,151,406 A | 11/2000 | Chang et al. |
| 6,154,566 A | 11/2000 | Mine et al. |
| 6,154,567 A | 11/2000 | McGarry |
| 6,173,066 B1 | 1/2001 | Peurach et al. |
| 6,173,070 B1 | 1/2001 | Michael et al. |
| 6,178,261 B1 | 1/2001 | Williams et al. |
| 6,178,262 B1 | 1/2001 | Picard et al. |
| 6,215,915 B1 | 4/2001 | Reyzin |
| 6,226,418 B1 | 5/2001 | Miller et al. |
| 6,246,478 B1 | 6/2001 | Chapman et al. |
| 6,252,986 B1 | 6/2001 | Chang |
| 6,272,244 B1 | 8/2001 | Takahashi et al. |
| 6,272,245 B1 | 8/2001 | Lin |
| 6,311,173 B1 | 10/2001 | Levin |
| 6,324,298 B1 | 11/2001 | O'Dell et al. |
| 6,324,299 B1 | 11/2001 | Sarachik |
| 6,327,393 B1 | 12/2001 | Bruder |
| 6,330,358 B1 * | 12/2001 | Nagaishi ........................ 382/178 |
| 6,345,106 B1 | 2/2002 | Borer |
| 6,363,173 B1 | 3/2002 | Stentz et al. |
| 6,378,009 B1 | 4/2002 | Pinkston, II et al. |
| 6,381,366 B1 | 4/2002 | Taycher et al. |
| 6,381,375 B1 | 4/2002 | Reyzin |
| 6,385,340 B1 | 5/2002 | Wilson |
| 6,393,151 B1 * | 5/2002 | Yamamoto et al. ............ 382/200 |
| 6,393,395 B1 * | 5/2002 | Guha et al. ..................... 704/232 |
| 6,408,109 B1 | 6/2002 | Silver et al. |
| 6,411,734 B1 | 6/2002 | Bachelder |
| 6,421,458 B2 | 7/2002 | Michael et al. |
| 6,424,734 B1 | 7/2002 | Roberts et al. |
| 6,453,069 B1 | 9/2002 | Matsugu et al. |
| 6,457,032 B1 | 9/2002 | Silver, et al. |
| 6,462,751 B1 | 10/2002 | Felser et al. |
| 6,466,923 B1 | 10/2002 | Young et al. |
| 6,501,856 B2 * | 12/2002 | Kuwano et al. ................ 382/194 |
| 6,516,092 B1 | 2/2003 | Bachelder |
| 6,529,852 B2 | 3/2003 | Knoll et al. |
| 6,532,301 B1 | 3/2003 | Krumm et al. |
| 6,563,324 B1 | 5/2003 | Nichani |
| 6,594,623 B1 | 7/2003 | Wang et al. |
| 6,614,926 B1 | 9/2003 | Fix et al. |
| 6,625,303 B1 | 9/2003 | Young et al. |
| 6,636,634 B2 | 10/2003 | Melikian et al. |
| 6,639,624 B1 | 10/2003 | Bachelder et al. |
| 6,658,145 B1 | 12/2003 | Silver et al. |
| 6,681,039 B1 | 1/2004 | Roberts et al. |
| 6,681,151 B1 | 1/2004 | Weinzimmer et al. |
| 6,687,402 B1 | 2/2004 | Taycher et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,714,679 B1 | 3/2004 | Scola et al. |
| 6,728,582 B1 | 4/2004 | Wallack |
| 6,748,104 B1 | 6/2004 | Bachelder et al. |
| 6,751,338 B1 | 6/2004 | Wallack |
| 6,751,361 B1 | 6/2004 | Wagman |
| 6,760,483 B1 | 7/2004 | Elichai et al. |
| 6,771,808 B1 | 8/2004 | Wallack |
| 6,785,419 B1 | 8/2004 | Jojic et al. |
| 6,836,567 B1 | 12/2004 | Silver et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,909,798 B1 | 6/2005 | Yukawa et al. |
| 6,959,112 B1 | 10/2005 | Wagman |
| 6,973,207 B1 | 12/2005 | Akopyan et al. |
| 6,975,764 B1 | 12/2005 | Silver et al. |
| 6,985,625 B1 | 1/2006 | Silver et al. |
| 6,993,177 B1 | 1/2006 | Bachelder |
| 6,993,192 B1 | 1/2006 | Silver et al. |
| 7,006,712 B1 | 2/2006 | Silver et al. |
| 7,016,539 B1 | 3/2006 | Silver et al. |
| 7,043,055 B1 | 5/2006 | Silver |
| 7,043,081 B1 | 5/2006 | Silver et al. |
| 7,058,225 B1 | 6/2006 | Silver et al. |
| 7,065,262 B1 | 6/2006 | Silver et al. |
| 7,088,862 B1 | 8/2006 | Silver et al. |
| 7,139,421 B1 | 11/2006 | Fix et al. |
| 7,164,796 B1 | 1/2007 | Silver et al. |
| 7,190,834 B2 * | 3/2007 | Davis ........................... 382/181 |
| 7,239,929 B2 | 7/2007 | Ulrich et al. |
| 7,251,366 B1 | 7/2007 | Silver et al. |
| 8,081,820 B2 | 12/2011 | Davis et al. |
| 2002/0054699 A1 | 5/2002 | Roesch et al. |
| 2005/0117801 A1 | 6/2005 | Davis et al. |

FOREIGN PATENT DOCUMENTS

| | | |
|---|---|---|
| JP | 3598651 | 9/2004 |
| JP | 3598651 | 12/2004 |
| WO | 97/18524 A2 | 5/1997 |

OTHER PUBLICATIONS

Pauwels, E. J., et al., "Finding Salient Regions in Images", *Computer Vision and Image Understanding*, Academic Press, San Diego, CA, US, vol. 75, No. 1-2, (Jul. 1999), 73-85.

Scanlon, James et al., "Graph-Theoretic Algorithms for Image Segmentation", *Circuits and Systems*, ISCAS '99 Proceedings of the 1999 IEEE International Symposium on Orlando, FL, IEEE, (May 30, 1999), 141-144.

Shi, Jianbo et al., "Normalized Cuts and Image Segmentation", *Computer Vision and Pattern Recognition*, Proceedings, IEEE Computer Society Conference on San Juan, IEEE Comput. Soc., (Jun. 17, 1997), 731-737.

Xie, Xuanli L., et al., "A New Fuzzy Clustering Validity Criterion and its Application to Color Image Segmentation", *Proceedings of the International Symposium on Intelligent Control*, New York, IEEE, (Aug. 13, 1991), 463-468.

Mehrotra, Rajiv et al., "Feature-Based Retrieval of Similar Shapes", *Proceedings of the International Conference on Data Engineering*, Vienna, IEEE Comp. Soc. Press, vol. COnf. 9, (Apr. 19, 1993), 108-115.

Belongie, S. et al., "Shape Matching and Object Recognition Using Shape Contexts", *IEEE Transactions on Pattern Analysis and Machine Intelligence*, IEEE Inc. New York, vol. 24, No. 4, (Apr. 2003), 509-522.

Ohm, Jens-Rainer "Digitale Bildcodierung", *Springer Verlag*, Berlin 217580, XP0002303066, Section 6.2 Bewegungschatzung, (1995).

Wei, Wen et al., "Recognition and Insprection of Two-Dimensional Industrial Parts Using Subpolygons", *Pattern Recognition*, Elsevier, Kidlington, GB, vol. 25, No. 12 (Dec. 1, 1992), 1427-1434.

Bileschi, S. et al., "Advances in Component-based Face Detection", *Lecture notes in Computer Science*, Springer Verlag, New York, NY, vol. 2388, (2002), 135-143.

Fitzpatrick, J M., et al., "Handbook of Medical Imaging", *Vol. 2: Medical image Processing and Analysis*, SPIE Press, Bellingham, WA, (2000), 447-513.

Bookstein, F L., "Principal Warps: Thin-Plate Splines and the Decomposition of Deformations", *IEEE Transactions on pattern Analysis and Machine Intelligence*, IEEE Inc., New York, vol. 11, No. 6, (Jun. 1, 1989).

Zhang, Zhengyou "Parameter estimation techniques: A tutorial with application to conic fitting", *Imag Vision Comput; Image and Vision computing*; Elsevier Science Ltd, Oxford England, vol. 15, No. 1, (Jan. 1, 1997).

Stockman, G et al., "Matching images to models for registration and object detection via clustering", *IEEE Transaction of Pattern Analysis and Machine Intelligence*, IEEE Inc., New York, vol. PAMI-4, No. 3, (1982).

Ballad, D. H., et al., "Generalizing the Hough Transform to Detect Arbitrary Shapes", *Pattern Recognition*, vol. 13, No. 2 Pergamon Press Ltd. UK, (1981), pp. 111-222.

Ballard, et al., "Searching Near and Approximate Location", Section 4.2, *Computer Vision*, (1982), pp. 121-131.

Brown, Lisa G., "A Survey of Image Registration Techniques", *ACM Computing Surveys*, vol. 24, No. 4 Association for Computing Machinery, (1992), pp. 325-376.

Caelli, et al., "Fast Edge-Only Matching Techniques for Robot Pattern Recognition", *Computer Vision, Graphics and Image Processing 39*, Academic Press, Inc., (1987), pp. 131-143.

Caelli, et al., "On the Minimum Number of Templates Required for Shift, Rotation and Size Invariant Pattern Recognition", *Pattern Recognition*, vol. 21, No. 3, Pergamon Press plc, (1988), pp. 205-216.

"Cognex 2000/3000/4000 Vision Tools", *Cognex Corporation*, Chapter 2 Searching Revision 5.2 P/N 590-0103, (1992), pp. 1-68.

"Cognex 3000/4000/5000 Programmable Vision Engines, Vision Tools", *Chapter 1 Searching*, Revision 7.4 590-1036, (1996), pp. 1-68.

Ballard, et al., "The Hough Method for Curve Detection", Section 4.3, *Computer Vision*, (1982), pp. 121-131.

"Cognex 3000/4000/5000 Programmable Vision Engines, Vision Tools", *Chapter 14 Golden Template Comparision*, (1996), pp. 569-595.

"Apex Search Object Library Functions", *Cognex Corporation*, (1998).

"Apex Search Object", *acuWin version 1.5*, (1997), pp. 1-35.

"Apex Model Object", *Cognex Corporation*, acuWin version 1.5, (1997), pp. 1-17.

"Description of Sobel Search", *Cognex Corporation*, (1998).

Crouzil, et al., "A New Correlation Criterion Based on Gradient Fields Similarity", *Proceedings of the 13th International Conference on Pattern Recognition Volume I Track A*, Computer Vision, (1996), pp. 632-636.

Grimson, et al., "On the Sensitivity of the Hough Transform for Object Recognition", *IEEE Transactions on Pattern Analysis and Machine Intelligence*, vol. 12. No. 3, (1990), pp. 255-274.

Hsieh, et al., "Image Registration Using a New Edge-Based Approach", *Computer Vision and Image Understanding*, vol. 67, No. 2, (1997), pp. 112-130.

Rosenfeld, et al., "Coarse-Fine Template Matching", *IEEE Transactions on Systems, Man, and Cybernetics*, (1997), pp. 104-107.

Tian, et al., "Algorithms for Subpixel Registration", *Computer Vision Graphics and Image Processing 35*, Academic Press, Inc., (1986), pp. 220-233.

Joseph, S. H., "Fast Optimal Pose Estimation for Matching in Two Dimensions", *Image Processing and its Applications, Fifth International Conference*, (1995).

Geiger, et al., "Dynamic Programming for Detecting, Tracking, an Matching Deformable contours", *IEEE* (1995), pp. 294-302.

Cootes, T. F., et al., "Active Shape Models—Their Training and Application", *Computer Vision and Image Understanding*, vol. 61, No. 1, (Jan. 1995), 38-59.

Shi, Jianbo et al., "Normalized Cuts and Image Segmentation", *IEEE Transaction on Pattern Analysis and Machine Intelligence*, vol. 22, No. 8, (Aug. 2000), 888-905.

Borgefors, Gunilla "Hierarchical Chamfer Matching: A Parametric Edge Matching Algorithm", *IEEE Transaction on Pattern Analysis and Mchine Intelligence*, vol. 10, No. 6, (Nov. 1988).

Huttenlocher, Daniel P., "Comparing Images using the Hausdorff Distance", *IEEE Transactions on Pattern Analysis and Machine Intelligence*, vol. 15, No. 9, (Sep. 1993).

Wallack, Aaron S., et al., Robust Algorithms for Object Localization, *International Journal of Computer Vision*, pp. 243-262, May 1998.

"Complaint and Jury Demand", US District Court, District of Massachusetts, *Cognex Corp.* and *Cognex Technology and Investment Corp.* v. *MVTEC Software GmbH; MVTEC, LLC;* and *Fuji America Corp.* Case No: 1:08-cv-10857-JLT, (May 21, 2008).

"Fuji America's Answer and Counterclaims", United States District Court District of Massachusetts, *Cognex Corp.* and *Cognex Technology and Investment Corp.* v. *MVTEC Software GmbH; MVTEC, LLC;* and *Fuji America Corp.* Case No: 1:08-cv-10857-JLT, (Aug. 8, 2008).

"Plaintiffs Cognex Corporation and Cognex Technology & Investment Corporation's Reply to Counterclaims of MVTEC Software GmbH and MVTEC LLC", *Cognex Corp.* and *Cognex Technology and Investment Corp.* v. *MVTEC Software GmbH; MVTEC, LLC;* and *Fuji America Corp.* Case No: 1:08-cv-10857-JLT, (Aug. 2008).

Ingemar J. Cox, Joseph B. Kruskal and Deborah A. Wallach, Predicting and Estimating the Accuracy of a Subpixel Registration Algorithm, IEEE Transactions on Pattern Analysis and Machine Intelligence, Aug. 1990, pp. 721-734, vol. 12, No. 8.

Jacques Feldmar, Nicholas Ayache and Fabienne Betting, 3D-2D Projective Registration of Free-Form Curves and Surfaces, Computer Vision and Image Understanding, Mar. 1997, pp. 403-424, vol. 65, No. 3.

Anil K. Jain, Yu Zhong and Sridhar Lakshmanan, Object Matching Using Deformable Templates, IEEE Transactions on Pattern Analysis and Machine Intelligence, Mar. 1996, pp. 267-278, vol. 18, No. 3.

William M. Wells III, Statistical Object Recognition, Submitted to the Department of Electrical Engineering and Computer Science, Nov. 24, 1992, pp. 1-177.

Zhengyou Zhang, Iterative Point Matching for Registration of Free-Form Curves, 2004, pp. 1-42.

Feng Lu, Shape Registration Using Optimization for Mobile Robot Navigation, Department of Computer Science, University of Toronto, 1995, pp. 1-163.

Donald B. Gennery, Visual Tracking of Known Three-Dimensional Objects, International Journal of Computer Vision, 1992, pp. 243-270.

Perkins, Inspector: A Computer Vision System that learns to Inspect Parts, IEEE Transactions on Pattern Analysis and Machine Vision Intelligence, vol. PAMI-5, No. 6, Nov. 1983.

Oct. 19, 2008 Amendment and Response, U.S. Appl. No. 11/023,177.
Oct. 16, 2008 Amendment and Response, U.S. Appl. No. 11/022,896.
Mar. 31, 2009 Amendment and Response, U.S. Appl. No. 11/022,896.
Oct. 29, 2009 Amendment and Response, U.S. Appl. No. 11/022,896.
Dec. 21, 2009 Amendment and Response, U.S. Appl. No. 11/022,896.
Apr. 10, 2009 Amendment and Response, U.S. Appl. No. 11/023,230.
Jan. 5, 2010 Amendment and Response, U.S. Appl. No. 11/023,230.
Jan. 22, 2009 Amendment and Response, U.S. Appl. No. 11/022,895.
Apr. 5, 2009 Amendment and Response, U.S. Appl. No. 11/022,895.
Nov. 13, 2009 Amendment and Response, U.S. Appl. No. 11/022,895.
Nov. 30, 2009 Amendment and Response, U.S. Appl. No. 11/022,895.
Dec. 31, 2008 Amendment and Response, U.S. Appl. No. 11/028,007.
Jun. 22, 2009 Amendment and Response, U.S. Appl. No. 11/028,007.
Dec. 29, 2009 Amendment and Response, U.S. Appl. No. 11/028,007.

Jan. 5, 2010 Amendment and Response, U.S. Appl. No. 11/029,116.
Jan. 22, 2009 Amendment and Response, U.S. Appl. No. 11/029,116.
Jul. 9, 2009 Amendment and Response, U.S. Appl. No. 11/029,116.
Jan. 5, 2010 Amendment and Response, U.S. Appl. No. 11/028,008.
Apr. 10, 2009 Amendment and Response, U.S. Appl. No. 11/028,008.
7/30/200 Amendment and Response, U.S. Appl. No. 11/028,353.
Feb. 12, 2008 Amendment and Response, U.S. Appl. No. 11/028,353.
Feb. 25, 2009 Amendment and Response, U.S. Appl. No. 11/028,353.
Sep. 24, 2009 Amendment and Response, U.S. Appl. No. 11/028,353.
Jan. 2, 2009 Amendment and Response, U.S. Appl. No. 11/026,004.
Jul. 15, 2009 Amendment and Response, U.S. Appl. No. 11/026,004.
Mar. 2, 2009 Amendment and Response, U.S. Appl. No. 11/026,996.
Aug. 13, 2009 Amendment and Response, U.S. Appl. No. 11/026,003.
Mar. 19, 2009 Amendment and Response, U.S. Appl. No. 11/028,255.
Dec. 31, 2008 Amendment and Response, U.S. Appl. No. 11/027,962.
Nov. 3, 2009 Amendment and Response, U.S. Appl. No. 11/027,962.
Nov. 30, 2009 Amendment and Response, U.S. Appl. No. 11/027,962.
Apr. 7, 2009 Amendment and Response, U.S. Appl. No. 11/027,962.
Mar. 2, 2009 Amendment and Response, U.S. Appl. No. 11/027,963.
Mar. 2, 2009 Amendment and Response, U.S. Appl. No. 11/029,104.
Jul. 27, 2009 Amendment and Response, U.S. Appl. No. 11/029,104.
Oct. 19, 2007 Amendment and Response, U.S. Appl. No. 10/625,201.
May 31, 2007 Amendment and Response, U.S. Appl. No. 10/625,201.
Jun. 3, 2009 Amendment and Response, U.S. Appl. No. 10/625,201.
Feb. 16, 2010 Appeal Brief, U.S. Appl. No. 10/949,530.
Dec. 27, 2007 Amendment and Response, U.S. Appl. No. 10/949,530.
Jun. 13, 2008 Amendment and Response, U.S. Appl. No. 10/949,530.
Feb. 6, 2009 Amendment and Response, U.S. Appl. No. 10/949,530.
Jul. 19, 2007 Amendment and Response, U.S. Appl. No. 10/949,530.
Feb. 5, 2008 Submission of Translation to German Patent Reference DE 4406020, U.S. Appl. No. 10/625,201.
Alexander, et al. "The Registration of MR Images Using Multiscale Robust Methods," Magnetic Resonance Imaging, vol. 14, No. 5, pp. 453-468 (1996).
Anisimov, V. et al. "Fast hierarchical matching of an arbitrarily oriented template," Pattern Recognition Letters, vol. 14, No. 2, pp. 95-101 (1993).
Anuta, P., Spatial Registration of Multispectral and Multitemporal Digital Imagery Using Fast Fourier Transform Techniques, IEEE Transactions on Geoscience Electronics, Oct. 1970, pp. 353-368, vol. GE-8, No. 4.
Araujo, H. et al. "A Fully Projective Formulation of Lowe's Tracking Algorithm," Technical Report 641, Computer Science Department, University of Rochester (1996).
Ashburner, J., et al., "Incorporating Prior Knowledge into Image Registration, " Neuroimage, vol. 6, No. 4, pp. 344-352 (1997).
Ashburner, J., et al., "Nonlinear Spatial Normalization Using Basis Functions," Human Brain Mapping, vol. 7, No. 4, pp. 254-266 (1999).
Ashburner, J., et al., "Nonlinear Spatial Normalization Using Basis Function," The Wellcome Depart. Of Cognitive Neurology, Institute of Neurology, Queen Square, London, UK, pp. 1-34, 1999.
Bachelder, I. et al. "Contour Matching Using Local Affine Transformations," Massachusetts Institute of Technology Artificial Intelligence Laboratory, A.I. Memo No. 1326 (Apr. 1992).
Baker, J. "Multiresolution Statistical Object Recognition," Master's thesis, Massachusetts Institute of Technology (1994).
Baker, J. et al. "Multiresolution Statistical Object Recognition," Artificial Intelligence Laboratory, Massachusetts Institute of Technology, pp. 1-6, 1994.
Balkenius, C. et al. "Elastic Template Matching as a Basis for Visual Landmark Recognition and Spatial Navigation," Lund University Cognitive Science, 1997, pp. 1-10.
Balkenius, C. et al. "The XT-1 Vision Architecture," Symposium on Image Analysis, Lund University Cognitive Science, 1996, pp. 1-5.

Besl, P. et al., A Method for Registration of 3-D Shapes, IEEE Transactions on Pattern Analysis and Machine Intelligence, Feb. 1992, pp. 239-256, vol. 14, No. 2.
Bichsel, M. et al., "Strategies of Robust Object Recognition for the Automatic Indentification of Human Faces," (1991), pp. 1-157, PhD thesis, ETH, Zurich.
Blais, G. et al. "Registering Multiview Range Data to Create 3D Computer Objects," IEEE Transactions on Pattern Analysis and Machine Intelligence, vol. 17, No. 8, pp. 820-824 (Aug. 1995).
Breul, T. "Geometric Aspects of Visual Object Recognition," Technical Report 1374, MIT Artificial Intelligence Laboratory, May 1992, pp. 1-173.
Bruckstein, Alfred M., and Larry O'Gorman and Alon Orlitsky, "Design of Shapes for Precise Image Registration," IEEE Transactions on Information Theory, vol. 44, No. 7, Nov. 1998.
Buzug, T.M., et al., "Using an Entropy Similarity Measure to Enhance the Quality of DSA Images with an Algorithm Based on Template Matching," Visualization in Biomedical Computer, pp. 235-240, 1996.
Chen, Y. et al. "Object Modeling by Registration of Multiple Range Images," in IEEE ICRA, pp. 2724-2729 (1991).
Chen, Y. et al. "Object modeling registration of multiple range images," Image and Vision Computing, vol. 10, No. 3, pp. 145-155 (1992).
Cognex Corporation, "Chapter 7 CONLPAS," Cognex 3000/4000/5000 Programmable Vision Engines, Vision Tools, Revision 7.4, P/N 590-0136, pp. 307-340 (1996).
Cognex Corporation, Cognex 3000/4000/5000 Vision Tool, Revision 7.6, Chapter 4, Caliper Tool, 1996.
Cognex Corporation, Cognex 3000/4000/5000 Vision Tool, Revision 7.6, Chapter 5, Inspection, 1996.
Cognex Corporation, Cognex 3000/4400 SMD Tools Release 5.2, SMD 2, 1994.
Cognex Corporation, Cognex 4000/5000 SMD Placement Guidance Package, User's Manual Release 3.8.00, 1998.
Cognex Corporation, Cognex MVS-8000 Series, CVL Vision Tools Guide, pp. 25-136, Release 5.4 590-6271, Natick, MA USA 2000.
Cognex Corporation, "Chapter 13 Golden Template Comparison," Cognex 3000/4000/5000 Vision Tools, pp. 521-626, Natick, MA, USA, 1996.
Cognex Corporation, Cognex MVS-8000 Series, GDE User's Guide, Revision 1.1, Apr. 7, 2000.
Cox, I. et al., "On the Congruence of Noisy Images to Line Segment Models," International Conference on Computer Vision, pp. 252-258 (1988).
Cox, I. et al., "Predicting and Estimating the Accuracy of a Subpixel Registration Algorithm," IEEE Transactions on Pattern Analysis and Machine Intelligence, vol. 12, No. 8, pp. 721-734 (Aug. 1990).
Dana, K. et al. Registration of Visible and Infrared Images, pp. 1-12, vol. 1957, 1993.
DeClerck, J. et al. "Automatic Registration and Alignment on a Template of Cardiac Stress & Rest SPECT Images," IEEE Proc. of MMBIA 1996, pp. 212-221.
DeFigueiredo et al. Model Based Orientation Independent 3-D Machine Vision Techniques, IEEE Transactions on Aerospace and Electronic Systems, vol. 24, No. 5 Sep. 1998, pp. 597-607.
DeMenthon, D. et al. "Model-Based Object Pose in 25 Lines of Code," Proceedings of the Second European Conference on Computer Vision, pp. 335-343 (1992).
DeMenthon, D. F. et al. Model-Based Object Pose in 25 Lines of Code, International Journal of Computer Vision, 1995, pp. 123-141. Kluwer Academic Publisher, Boston, MA.
Devernay. F., "A Non-Maxima Suppression Method for Edge Detection with Sub-Pixel Accuracy," Institut National de Recherche en Informatique et en Automatique, No. 2724, Nov. 1995, 24 pages.
Dorai, C. et al. "Optimal Registration of Multiple Range Views," IEEE 1994, pp. 569-571.
Drewniok, C. et al. "High-Precision Localization of Circular Landmarks in Aerial Images," Proc. 17, DAGM-Symposium, Mustererkennung 1995, Bielefeld, Germany, Sep. 13-15, 1995, pp. 594-601.

Eric, W. et al., On the Recognition of Parameterized 2D Objects, International Journal of Computer Vision, 1988, Kluwer Academic Publishers, Boston, MA, pp. 353-372.

Feddema, J. T. et al. Weighted Selection of Image Features for Resolved Rate Visual Feedback Control, IEEE Transactions on Robitics and Automation, vol. 7 No. 1, Feb. 1991, pp. 31-47.

Feldmar, J. et al. "3D-2D projective registration of free-form curves and surfaces," Institut National de Recherche en Informatique et en Automatique, No. 2434, Dec. 1994, 47 pages.

Fischer, Andre, and Thomas Kolbe and Felicitas Lang, On the Use of Geometric and Semantic Models for Component-Based Building Reconstruction: Institute for Photogrammetry, University of Bonn, pp. 101-119, 1999.

Foley, James D., Andries Van Dam, Steven K. Feiner, John F. Hughes, "Second Edition in C, Computer Graphics Priciples and Practice," pp. 48-51, Addison-Wesley Publishing Company, 1996, USA.

Foley, J. D. er al., "Introduction to Computer Graphics," pp. 36-49 (1994).

Forsyth, D. et al., "Invariant Descriptors for 3-D Object Recognition and Pose," IEEE Transactions on Pattern Analysis and Machine Intelligence, vol. 13, No. 10, Oct. 1991, pp. 971-991.

Foster, Nigel J., "Determining objection orientation using ellipse fitting," SPIE vol. 521—Intelligent Robots and Computer Vision, 1985, pp. 34-43.

Foster, Nigel J., et al., "Determining objection orientation from a single image using multiple information sources," CMU-RI-TR-84-15, Jun. 1984, pp. 1-96.

Foster, Nigel J., "Attributed Image Matching Using a Minimum Representation Size Criterion," PhD. Thesis, Carnegie Mellon University, 1987, pp. 1-142.

Gavrilla et al. "3-D Model-Based Tracking of Humans in Action: A Multi-View Approach," Computer Vision Laboratory, 1996, pp. 73-80.

Gavrilla, D. et al. "3-D Model-Based Tracking of Human Upper Body Movement: A Multi-View Approach," Computer Vision Laboratory, 1995, pp. 253-258.

Gavrilla, D. "Multi-feature Hierarchial Template Matching Using Distance Transforms," Daimler-Benz AG, Research and Technology, 6 pages, 1998.

Ge, Y. et al. "Surface-based 3-D image registration using the Iterative Closest Point algorithm with a closest point transform," Medical Imaging 1996: Image Processing, M. Loew, K. Hanson, Editors, Proc. SPIE 2710, pp. 358-367 (1996).

Gennery, D. "Visual Tracking of Known Three-Dimensional Objects," International Journal of Computer Vision, vol. 7, No. 3, pp. 243-270 (1992).

Gorman, "Recognition of incomplete polygonal objects", IEEE, pp. 518-522, 1989.

Gottesfeld Brown, L. M. et al. "Registration of Planar Film Radiographs with Computed Tomography," 1996 Workshop on Mathematical Methods in Biomedical Image Analysis (MMBIA '96), pp. 42-51 (1996).

Haag, M. et al. Combination of Edge Element and Optical Flow Estimates for 3-D-Model-Based Vehicle Tracking in Traffic Images Sequences, International Journal of Computer Vision, 1999, pp. 295-319.

Han, R. et al., An Edge-Based Block Matching Technique for Video Motion, Image Processing Algorithms and Techniques II, 1991, pp. 395-408, vol. 1452.

Haralick, R., et al., "Pose Estimation from Corresponsing Point Data," IEEE Trans. On Systems, Man and Cybernetics, vol. 19, No. 6, pp. 1426-1445, 1989.

Hashimoto et al, M., "High-Speed Template Matching Algorithm Using Contour Information," Proc. SPIE, vol. 1657, pp. 374-385 (1992).

Hashimoto, M. et al. "An Edge Point Template Matching Method for High Speed Difference Detection between Similar Images," Industrial Electronics and Systems Development Laboratory Mitsubishi Electric Corp., PRU, vol. 90, No. 3, (1990), 8 pages.

Hashimoto, M. et al. "High Speed Template Matching Algorithm Using Information of Edge Points," Trans. IEICE Technical Report D-II, vol. J74-D-II, No. 10, pp. 1419-1427 (Oct. 1991).

Hashimoto, M, et al., "High-Speed Template Matching Algorithm Using Information of Contour Points," Systems & Computers in Japan, vol. 23, No. 9, pp. 78-87 (1992).

Hauck A. et al. "A Hierarchial World Model with Sensor- and Task-Specific Features," 8 pages, 1996.

Hauck, A. et al. "Hierarchial Recognition of Articulated Objects from Single Perspective Views," 7 pages, 1997.

Havelock, David J., "Geometric Precision in Noise-Fee Digital Images," IEEE Transactions on Pattern Analysis and Machine Intelligence, vol. II, No. 10, Oct. 1989.

Hill, John W., Machine Intelligence Research Applied to Industrial Automation, U.S. Department of Commerce, National Technical Information Service, SRI International Tenth Report, Nov. 1980.

Hill et al.,"Medical Image Registration," Institute of Physics Publishing: Phys. Med, Biol. 46 (2001), pp. R1-R45.

Hill, D. et al., "Voxel Similarity Measures for Automated Image Registration," Proc. SPIE, vol. 2359, pp. 205-216 (1994).

Hirako, K. "Development of an automated detection system for microcalcifications lesion in mammography" Trans. IEICE Japan D-II, vol. J78-D-II, No. 9, pp. 1334-1343 (Sep. 1995).

Hirooka, M, et al., "Hierarchical distributed template matching," Proc. SPIE vol. 3029, p. 176-183 (1997).

Hoff, W.A., et al. "Pose Estimation of Artificial Knee Implants in Fluoroscopy Images Using a Template Matching Technique," Proc. of $3^{rd}$ IEEE Workshop on Applications of Computer Vision, Dec. 2-4, 1996, 7 pages.

Holden, M. et al. "Voxel Similarity Measures for 3-D Serial MR Brain Image Registration," IEEE Transactions on Medical Imaging, vol. 19, No. 2, pp. 94-102 (2000).

Hoogs, Anthony and Ruzena Bajesy, Model-based Learning of Segmentations, pp. 494-499, IEEE, 1996.

Hu, et al, "Expanding the Range of Convergence of the CORDIC Algorithm," IEEE Transactions on Computers, vol. 40, No. 1, pp. 13-21 (Jan. 1991).

Hu, Y., "CORDIC-Based VLSI Architectures for Digital Signal Processing," IEEE Signal Processing Magazine, pp. 16-35, 1053-5888/92 (Jul. 1992).

Hugli, et al. "Geometric matching of 3D objects assessing the range of successful initial configurations", IEEE, pp. 101-106, 1997.

Hung, D. et al. "Subpixel Edge Estimation Using Geometrical Edge Models with Noise Miniaturization," 1994, pp. 112-117.

Hutchinson, Seth, and Greg Hager and Peter Corke, "A Tutorial on Visual Servo Control" IEEE Transactions on Robotics and Automation, vol. 12, No. 5, Oct. 1996, 20 pages.

Huttenlocher, D. F. et al., "A Multi-Resolution Technique for Comparing Images Using the Hausdorff Distance," 1993 IEEE, pp. 705-706.

Jacobs, D.W., The Use of Grouping in Visual Object Recognition, MIT Artificial Intelligence Laboratory, Office of Naval Research, pp. 1-162, Oct. 1988.

Jähne, B. et al. Geiβler, Handbook of Computer Vision and Applications, vol. 2, Academic Press, (1999), Chapter 5, 43 pages.

Jain, A. K. et al. "Object Matching Using Deformable Templates, IEEE Transactions on Pattern Analysis and Machine Intelligence," Mar. 1996, pp. 267-278, vol. 18, No. 3.

Jain, R. et al., "Machine Vision," McGraw-Hill, 1995, 207 pages.

Jebara, T.S., 3D Pose Estimation and Normalization for Face Recognition, Undergraduate Thesis, Department of Electrical Engineering, McGill University May 1996, 138 pages.

Jiang, H. et al., "A New Approach to 3-D Registration of Multimodality Medical Images by Surface Matching," SPIE vol. 1808, pp. 196-213 (1992).

Jiang, H. et al., "Image Registration of Multimodality 3-D Medical Images by Chamfer Matching," Biomedical Image Processing and Three Dimensional Microscopy, SPIE vol. 1660, pp. 356-366 (1992).

Jokinen, O. "Building 3-D City Models from Multiple Unregistered Profile Maps," First International Conference on Recent Advances in 3-D Digital Imaging and Modeling, pp. 242-249 (1997).

Jokinen, O. "Matching and modeling of multiple 3-D disparity and profile maps," Ph.D Thesis, Helsinki Univ. of Technology, Helsinki, Finland (2000).

Jokinen, O., et al. "Relative orientation of two disparity maps in stereo vision," 6 pages, 1995.

Jokinen, O., Area-Based Matching for Simultaneous Registration of Multiple 3-D Profile Maps, CVIU, vol. 71, No. 3, pp. 431-447 (Sep. 1998).

Jokinen, O., "Area Based Matching for Simultaneous Registration of Multiple 3-D Profile Maps," Institute of Photogrammetry and Remote Sensing, Helsinki Univ. of Tech., 16 pages, 1998.

Jordan, J. "Alignment mark detection using signed-contrast gradient edge maps," Proc. SPIE, vol. 1661, pp. 396-407 (1992).

Kashioka, Seiji, et al., "A Transistor Wire-Bonding System Utilizing Multiple Local Pattern Matching Techniques," pp. 562-570, 1976.

Kawamura, et al. "On-Line Recognition of Freely Handwritten Japanese Characters Using Directional Feature Densities", IEEE, pp. 183-186, 1992.

Kersten, T. et al. "Automatic Interior Orientation of Digital Aerial Images" Photogrammetric Engineering& Remote Sensing, vol. 63, No. 8, pp. 1007-1011 (1997).

Kersten, T. et al. "Experiences with Semi-Automatic Aerotriangulation on Digital Photogrammetric Stations," Great Lakes Conference on Digital Photogrammetry and Remote Sensing (1995).

Koller, D. et al. "Model-Based Object Tracking in Monocular Image Sequences of Road Traffic Scenes, International Journal of Computer Vision," pp. 257-281.

Kollnig, H. et al. 3D Post Estimation by Fitting Image Gradients Directly to Polyhedral Models, IEEE, 1995, pp. 569-574.

Kollnig, H. et al., 3D Post Estimation by Directly Matching Polyhedral Models to Gray Value Gradients, International Journal Computer Vision, 1997, pp. 283-302.

Kovalev et al., "An Energy Minimization Approach to the Registration, Matching and Recognition of Images," Lecture Notes In Computer Science, vol. 1296, Proceedings of the 7th International Conference on Computer Analysis of Images and Patterns, pp. 613-620 (1997).

Lamden, Y et al., Affine Invariant Model-Based Object Recognition, IEEE Transactions on Robotics and Automation, Oct. 1990, pp. 578-589, vol. 6, No. 5.

Lang, G. K. et al. Robust Classification of Arbitrary Object Classes Based on Hierarchial Spatial Feature-Matching, Machine Vision and Applications, 1997, pp. 123-135.

Lanser, S. et al., "Robust Video-Based Object Recognition Using CAD Models" 8 pages, 1995.

Lanser, S. et al., "MORAL—A Vision-Based Object Recognition System for Autonomous Mobile Systems," 9 pages, 1997.

Lemieux, L. et al., "A Patient-to-Computer-Tomography Image Registration Method Based on Digitally Reconstructed Radiographs," Med. Phys., vol. 21, No. 11, pp. 1749-1760 (Nov. 1994).

Li, H. et al. A Contour-Based Approach to Multisensor Image Registration, IEEE Transactions on Image Processing, Mar. 1995, pp. 320-334, vol. 4, No. 3.

Li, Z, et al., On Edge Preservation in Multiresolution Images, Graphical Models and Image Processing, 1992, pp. 61-472, vol. 54, No. 6.

Lin, et al., "On-Line CORDIC Algorithms," IEEE Transactions on Computers, pp. 1038-1052, vol. 39, No. 8, 1990.

Lindeberg, T. Discrete Derivative Approximations with Scale-Space Properties: A Basis for Low-Level Feature Extraction, Journal of Mathematical Imaging and Vision, 1993, pp. 349-376.

Lu, F. Shape Registration Using Optimization for Mobile Reboot Navigation, Department of Computer Sciences, University of Toronto, 1995, pp. 1-163.

Maes, et al., "Multimodality Image Registration by Maximization of Mutual Information," IEEE Transactions on Medical Imaging, vol. 16, No. 2, Apr. 1997, pp. 187-198.

Maes, F. "Segmentation and Registration of Multimodal Medical Images," PhD Thesis, Katholieke Universiteit Leuven (1998).

Maes, F. et al. "Comparative evaluation of multiresolution optimization strategies for multimodality image registration by maximization of mutual information," Medical Image Analysis, vol. 3, No. 4, pp. 373-386 (1999).

Maio, D. et al. Real-time face location on Gray-Scale Static Images, Pattern Recognition, The Journal of the Pattern Recognition Society, 2000, pp. 1525-1539.

Makous, W., "Optimal Patterns for Alignment," Applied Optics, vol. 13, No. 3, Mar. 1974, 6 pages.

Marchand, E. et al., "Robust Real-Time Visual Tracking Using a 2D-3D Model-Based Approach," IEEE, 7 pages, 2000.

Marchand, E. et al., "A 2D-3D Model-Based Approach to Real-Time Visual Tracking," Institut National de Recherche en Informatique et en Automatique, No. 3920, Mar. 2000, 33 pages.

Masuda et al., "A Robust Method for Registration and Segmentation of Multiple Range Images," Computer Vision and Image Understanding, vol. 61, No. 3, May pp. 295-307 (1995).

Masuda et al., "Detection of partial symmetry using correlation with rotatedreflected images," Pattern Recognition, vol. 26, No. 88, pp. 1245-1253 (1993).

Medina-Mora, R., "An Incremental Programming Environment," IEEE Transactions on Software Engineering, Sep. 1981, pp. 472-482, vol. SE-7, No. 5, 1992.

Meijering et al., "Image Registration for Digital Subtraction Angiography," International Journal of Computer Vision, vol. 31, No. 2, pp. 227-246 (1999).

Miller, et al. (Template Based Method Of Edge Linking Using a Weighted Decision), IEEE, pp. 1808-1815, 1993.

Neveu, C.F. et al. "Two-Dimensional Object Recognition Using Multiresolution Models, Computer Vision, Graphics, and Image Processing," 1986, pp. 52-65.

Newman, Timothy S., Anil K. Jain and H.R. Keshavan, "3D CAD-Based Inspection I: Coarse Verification," IEEE, 1992, pp. 49-52.

O'Gorman, Lawrence, "Subpixel Precision of Straight-Edged Shapes for Registration and Measurement," IEEE Transactions on Pattern Analysis and Machine Intelligence, vol. 18, No. 7, Jul. 1996, 6 pages.

Oberkampf, D. et al., "Iterative Pose Estimation Using Coplanar Feature Points," Computer Vision and Image Understanding, vol. 63, No. 3, pp. 495-511 (1996).

Oberkampf, D. et al., "Iterative Pose Estimation Using Coplanar Points," International Conference on Computer Vision and Pattern Recognition, pp. 626-627 (1993).

Olson, C.F. et al. "Automatic Target Recognition by Matching Oriented Edge Pixels, IEEE Transactions on Image Processing," Jan. 1997, pp. 103-113, vol. 6, No. 1.

Olson, C.F. et al. "Recognition by matching dense, oriented edge pixels," in Proc. Int. Symp. Comput. Vision, pp. 91-96 (1995).

Perkins, W. A.; "Inspector: A Computer Vision System That Learns to Inspect Parts," IEEE Transactions on Pattern Analysis and Machine Intelligence, Nov. 1983, pp. 584-592, vol. PAM1-5, No. 6.

Pluim et al., "Interpolation Artifacts in Mutual Information-Based Image Registration," Computer Vision and Image Understanding 77, 211-232 (2000).

Pluim, J. "Multi-Modality Matching Using Mutual Information," Master's thesis, Department of Computing Science, University of Groningen (1996).

Pluim, J. P. W., et al., "Mutual information matching and interpolation artefacts," Proc. SPIE, vol. 3661, (1999), 10 pages.

Pratt, W. K., "Digital Image Processing," $2^{nd}$ Edition, Wiley-Interscience, pp. 651-673, 1991.

Rignot, E et al. "Automated Multisensor Registration: Requirements and Techniques," Photogrammetric Engineering & Remote Sensing, vol. 57, No. 8, pp. 1029-1038 (1991).

Roche, A. et al. "Generalized Correlation Ratio for Rigid Registration of 3D Ultrasound with MR Images," Medical Image Computing and Computer-Assisted Intervention—MICCAI 2000, pp. 567-577 (2000).

Roche, A. et al. "Multimodal Image Registration by Maximization of the Correlation Ratio," Rapport de Récherche No. 3378, Unité de Recherche INRIA Sophia Antipolis, INRIA (Aug. 1998).

Roche, A. et al. "The Correlation Ratio as a New Similarity Measure for Multimodal Image Registration," Medical Image Computing and Computer-Assisted Intervention—MICCAI'98, pp. 1115-1124 (1998).

Rueckert, D. et al. "Nonrigid Registration Using Free-Form Deformations: Application to Breast MR Images," IEEE Transactions on Medical Imaging, vol. 18, No. 8, pp. 712-721 (1999).

Rueckert, D. et al., "Non-rigid Registration of Breast MR Images Using Mutual Information", Proceedings of the Medical Image Computing and Computer Assisted Intervention Society, pp. 1144-1152 (1998).

Rummel, P. et al., "Workpiece Recognition and Inspection by a Model-Based Scene Analysis System," Pattern Recognition, 1984, pp. 141-148, vol. 17, No. 1.

Sakai, T. et al., "Line Extraction and Pattern Detection in a Photograph," Pattern Recognition, 1969, pp. 233-248, vol. 1.

Sanderson, Arthur, and Nigel Foster, "Attributed Image Matching Using a Minimum Representation Size Criterion," IEEE 1989, pp. 360-365.

Schütz, H. et a., "Recognition of 3-D Objects with a Closest-Point Matching Algorithm," Proc. conference ISPRS intercommission workshop, vol. 30, issue 5W1 (1995), 6 pages.

Seitz, P. "The robust recognition of object primitives using local axes of symmetry," Signal Processing, vol. 18, pp. 89-108 (1989).

Seitz, P. et al., "The Robust Recognition of Traffic Signs From a Moving Car," pp. 287-294, 1991.

Seitz, P., "Using Local Orientational Information as Image Primitive for Robust Object Recognition," Visual Communications and Image Processing IV, 1989, pp. 1630-1639, vol. 1199.

Shekhar, C. et al. "Multisensor image registration by feature concensus," Pattern Recognition, vol. 32, No. 1, pp. 39-52 (1999).

Steger, C. "An Unbiased Detector of Curvilinear Structures," Technische Universitat Munchen, Technical Report FGBV-96-03, Jul. 1996, 32 pages.

Stevens, M. R. et al. "Precise Matching of 3-D Target Models to Multisensor Data," IEEE Transactions on Image Processing, vol. 6, No. 1, Jan. 1997, pp. 126-142.

Stimets, R. W. et al., "Rapid Recognition of Object Outlines in Reduced Resolution Images," Pattern Recognition, 1986, pp. 21-33, vol. 19, No. 1.

Streilein, A. et al., "Towards Automation in Architectural Photogrammetry: CAD Based 3D-Feature Extraction," ISPRS Journal of Photogrammetry and Remote Sensing, pp. 4-15, 1994.

Studholme et al., "An Overlap Invariant Entropy Measure of 3D Medical Image Alignment," Pattern Recognition, The Journal of the Pattern Recognition Society, Pattern Recognition 32, 71-86 (1999).

Studholme, C. "Measures of 3D Medical Image Alignment," PhD thesis, University of London (1997).

Suk, M. et al. "New Measures of Similarity Between Two Contours Based on Optimal Bivariate Transforms," Computer Vision, Graphics and Image Processing, 1984, pp. 168-182.

Sullivan, G. D. et al. "Model-based Vehicle Detection and Classification Using Orthographic Approximations," Image and Vision Computing 15, 1997, pp. 649-654.

Sullivan, G. et al. "Model-based vehicle detection and classification using orthographic approximations," The University of Reading, 10 pages, 1997.

Sullivan, Neal T., "Semiconductor Pattern Overlay," Digital Equipment Corp., Advanced Semiconductor Development, Critical Dimension Metrology and Process Control, Critical Reviews vol. CR52, 29 pages.

Tanaka, M. et al., "Picture Assembly Using a Hierarchical Partial-Matching Technique," IEEE Transactions on Systems, Man, and Cybernetics, vol. SMC-8, No. 11, pp. 812-819 (Nov. 1978).

Tangelder, J. W. H. et al., "Measurement of Curved Objects Using Gradient Based Fitting and CSG Models," Commission V, Working Group 2, 8 pages, 1999.

Tanimoto, S. L., "Template Matching in Pyramiids," Computer Graphics and Image Processing, vol. 16, pp. 356-369 (1981).

Thévenaz, P. et al "Optimization of Mutual Information for Multiresolution Image Registration," IEEE Transactions on Image Processing, vol. 9, No. 12, pp. 2083-2099 (Dec. 2000).

Tretter, D. et al. "A Multiscale Stochastic Image Model for Automated Inspection," IEEE Transaction on Image Processing, Dec. 1995, pp. 1641-1654, vol. 4, No. 12.

Turk, G. et al. "Zippered Polygon Meshes from Range Images," SIGGRAPH/ACM 1994, 8 pages.

Ullman, S. et al., "Recognition by Linear Combinations of Models," A.I. Memo No. 1152, Massachusetts Institute of Technology Artificial Intelligence Laboratory, 1989, 43 pages.

Ullman, S., "Aligning pictorial descriptions: An approach to object recognition," Cognition, vol. 32, No. 3, pp. 193-254, Aug. 1989.

Umeyama, S., "Least-Squares Estimation Transformation Parameters Beteween Two Point Patterns," IEEE Trans. on Pattern Analysis and Machine Intelligence, vol. 13, No. 2, pp. 119-152, 1994.

Valkenburg, R. J. et al., "An Evaluation of Subpixel Feature Localisation Methods for Precision Measurement," SPIE vol. 2350, 1994, 10 pages.

Van Herk, M. et al. "Automatic three-dimensional correlation of CT-CT, CTMRI, and CT-SPECT using chamfer matching," Medical Physics, vol. 21, No. 7, pp. 1163-1178 (1994).

Vosselman, G. "Interactive Alignment of Parameterised Object Models to Images," Commission III, Working Group 3, 7 pages, 1998.

Wachter S. et al., "Tracking Persons in Monocular Image Sequences," Computer Vision and Image Understanding, vol. 74, No. 3, Jun. 1999, pp. 174-192.

Wallack, Aaron, "Algorithms and Techniques for Manufacturing," Ph.D. Thesis, Unviersity of California at Berkeley, 1995, Chapter 4, 93 pages.

Weese, J. et al. "Gray-Value Based Registration of CT and MR Images by Maximization of Local Correlation," Medical Image Computing and Computer-Assisted Intervation—MICCAI'98, pp. 656-664 (1998).

Wells et al., "Multi-modal Volume Registration by Maximization of Mutual Information," Medical Image Analysis (1996) vol. 1, No. 1, pp. 35-51.

Wells, W. "Statistical Approaches to Feature-Based Object Recognition," International Journal of Computer Vision, vol. 21, No. 1/2, pp. 63-98 (1997).

Wells, W. "Statistical Object Recognition," Ph.D. Thesis Submitted to the Massachusett Institute of Technology, Department of Electrical Engineering and Computer Science, 1993, 177 pages.

Westling, M.D., et al., "Object recognition by fast hypothesis generation and reasoning about object interactions," 7 pages, 1996.

Whichello, A. et al. "Document Image Mosaicing," IEEE, 3 pages, 2006.

White et al., "Two Methods of Image Extension," Computer Vision, Graphics, and Image Processing 50, 342-352 (1990).

Wilson, S. "Vector morphology and iconic neural networks," IEEE Trans. Systems Man Cybernet, vol. 19, No. 6, pp. 1636-1644 (1989).

Wong, R. et al. "Sequential hierarchical scene matching," IEEE Trans. Comput., vol. C-27, pp. 359-366 (1978).

Worrall, A.D. et al. "Pose Refinement of Active Models Using Forces in 3D," 10 pages, 1994.

Wunsch, P. "Registration of CAD-Models to Images by Iterative Inverse Perspective Matching," International Conference on Pattern Recognition, vol. 1, pp. 78-83 (1996).

Yamada, H. "Map Matching-Elastic Shape Matching by Multi-Angled Parallelism," Apr. 1990, pp. 553-561, vol. J73-D-II, No. 4.

Zhang, Z., "Iterative Point Matching for Registration of Free-Form Curves," INRIA, Rapports de Recherche No. 1658, Programme 4, Robotique, Image et Vision, Unité De Recherche Inria-Sophia Antipolis (Mar. 1992).

Zhang, Z., "On Local Matching of Free-Form Curves," British Machine Vision Conference, pp. 347-356 (1992).

Zhang, Z., "Iterative point matching for registration of free-form curves and surfaces," IJCV, vol. 13, No. 2. pp. 119-152 (1994).

Expert Report of David Forsyth Regarding Invalidity of U.S. Patent Nos. 7,016,539 and 7,065,262, *Certain Machine Vision Software, Machine Vision Systems, and Products Containing Same*, ICT Investigation No. 337-TA-680, Feb. 19, 2010.

Rebuttal Expert Report of Dr. Berthold K.P. Horn, *Certain Machine Vision Software, Machine Vision Systems, and Products Containing Same*, ICT Investigation No. 337-TA-680, Mar. 9, 2010.

Dai, Xiaolong, A Feature-Based Image Registration Algorithm Using Improved Chain-Code Representation Combined with Invariant Moments, IEEE Transactions on Geoscience and Remote Sensing, vol. 37, No. 5, Sep. 1999.

Chiou-Ting Hsu, et al., Multiresolution Feature-Based Image Registration, in Visual Communications and Image Processing 2000, Proceedings of SPIE vol. 4067 (2000), pp. 1490-1498, Perth, Australia, Jun. 20-23, 2000.

Chew, et al., "Geometric Pattern Matching under Euclidean Motion", Computational Geometry, vol. 7, Issues 1-2, Jan. 1997, pp. 113-124, 1997 Published by Elsevier Science B.V.

"BPAI Decision on Appeal" mailed on Sep. 1, 2011 in Inter Partes Reexamination Proceedings of U.S. Patent No. 7,190,834, accorded Reexam Serial No. 95/001,180.

"Record of Oral Hearing" mailed on Aug. 5, 2011 in Inter Partes Reexamination Proceedings of U.S. Patent No. 7,190,834, accorded Reexam Serial No. 95/001,180.

"Third-Party Requester's Rebuttal Brief" filed on Dec. 10, 2010 in Inter Partes Reexamination Proceedings of U.S. Patent No. 7,190,834, accorded Reexam Serial No. 95/001,180.

"Examiner's Answer to Appeal Brief" mailed on Nov. 10, 2010 in Inter Partes Reexamination Proceedings of U.S. Patent No. 7,190,834, accorded Reexam Serial No. 95/001,180.

"Patent Owner Respondent Brief" filed on Jul. 23, 2010 in Inter Partes Reexamination Proceedings of U.S. Patent No. 7,190,834, accorded Reexam Serial No. 95/001,180.

"Corrected Appeal Brief—Third Party Requester" filed on Jul. 13, 2010 in Inter Partes Reexamination Proceedings of U.S. Patent No. 7,190,834, accorded Reexam Serial No. 95/001,180.

"Appeal Brief—Third Party Requester" filed on Jun. 23, 2010 in Inter Partes Reexamination Proceedings of U.S. Patent No. 7,190,834, accorded Reexam Serial No. 95/001,180.

"Right of Appeal Notice" mailed on Mar. 24, 2010 in Inter Partes Reexamination Proceedings of U.S. Patent No. 7,190,834, accorded Reexam Serial No. 95/001,180.

"Action Closing Prosecution (nonfinal)" mailed on Dec. 23, 2009 in Inter Partes Reexamination Proceedings of U.S. Patent No. 7,190,834, accorded Reexam Serial No. 95/001,180.

MvTec's Responses to Complaint and Notice of Investigation, US International Trade Commission, Investigation No. 377-TA-680, pp. 1-42 of Public Version, Sep. 3, 2009.

Mvtec LLC and Mvtec Software's Answer and Counterclaims, US District Court for the District of Massachusetts, C.A. No: 1:08-cv-10857 JLT, filed Aug. 8, 2008.

"Determination—Reexam Ordered" mailed on Aug. 28, 2009 in Inter Partes Reexamination Proceedings of U.S. Patent No. 7,190,834, accorded Reexam Serial No. 95/001,180.

"Corrected Original Inter Partes Request" filed on Jun. 8, 2009 in Inter Partes Reexamination Proceedings of U.S. Patent No. 7,190,834, accorded Reexam U.S. Appl. No. 95/001,180.

"Original Inter Partes Reexam Request" filed on Apr. 24, 2009 in Inter Partes Reexamination Proceedings of U.S. Patent No. 7,190,834, accorded Reexam Serial No. 95/001,180.

Christian Balkenius and Lars Kopp, "Elastic Template Matching as a Basis for Visual Landmark Recognition and Spatial Navigation," AISB workshop on "Spatial Reasoning in Mobile Robots and Animals", Jul. 1997, pp. 1-10.

Charles F. Neveu, Charles R. Dyer and Roland T. Chin, "Two-Dimensional Object Recognition Using Multiresolution Models," Computer Vision, Graphics, and Image Processing, 1986, pp. 52-65.

Dario Maio and Davide Maltoni, "Real-time face location on Gray-Scale Static Images," Pattern Recognition: The Journal of the Pattern Recognition Society, 2000, pp. 1525-1539.

Alexa Hauck, Stefan Lamer and Christoph Zierl, "Hierarchical Recognition of Articulated Objects from Single Perspective Views," pp. 1-7.

Martin Bichsel, "Strategies of Robust Object Recognition for the Automatic Identification of Human Faces," 1991, pp. 1-157.

D.M. Gavrila and L.S. Davis, "3-D Model-Based Tracking of Human Upper Body Movement: A Multi-View Approach," Computer Vision Laboratory, 1995, pp. 253-258.

T. Sakai, M. Nagao and S. Fujibayashi, "Line Extraction and Pattern Detection in a Photograph, Pattern Recognition," 1969, pp. 233-248, vol. 1.

P. Seitz, G.K. Lang, B. Gilliard and J.C. Pandazis, "The Robust Recognition of Traffic Signs From a Moving Car," pp. 287-294.

W. Eric and L. Grimson, "On the Recognition of Parameterized 2D Objects," International Journal of Computer Vision, 1988, Kluwer Academic Publishers, Boston, MA, pp. 353-372.

Graham K. Lang and Peter Seitz, "Robust Classification of Arbitrary Object Classes Based on Hierarchical Spatial Feature-Matching," Machine Vision and Applications, 1997, pp. 123-135.

D.M. Gavrila and L.S. Davis, "3-D Model-Based Tracking of Humans in Action: A Multi-View Approach," Computer Vision Laboratory, 1996, pp. 73-80.

Daniel Tretter, Charles A. Bouman, Khalid W. Khawaja and Anthony A. Maciejewski, "A Multiscale Stochastic Image Model for Automated Inspection," IEEE Transactions on Image Processing, Dec. 1995, pp. 1641-1654, vol. 4, No. 12.

"Claim Chart—Invalidity of the '834 Patent over the Balkenius Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Neveu Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the '984 Patent", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Maio Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Hauck Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Bichsel Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Gavrila Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Sakai Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Seitz and Lang Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Grimson Publication", Apr. 24, 2009, in Inter Partes Reexamination Proceedings of U.S. Patent No. 7,190,834, accorded Reexam Serial No. 95/001,180.

"Claim Chart—Invalidity of the '834 Patent over the Tretter Publication", Apr. 24, 2009, in Inter Partes Reexamination Proceedings of U.S. Patent No. 7,190,834, accorded Reexam Serial No. 95/001,180.

Cognex Corporation, description of Overlap in Cognex search tool and description of Overlap in Cnlpas Tool as of Jul. 12, 1997.

Cognex, Cognex Products on Sale as of one year before filing for US7016539, Jul. 12, 1997.

* cited by examiner

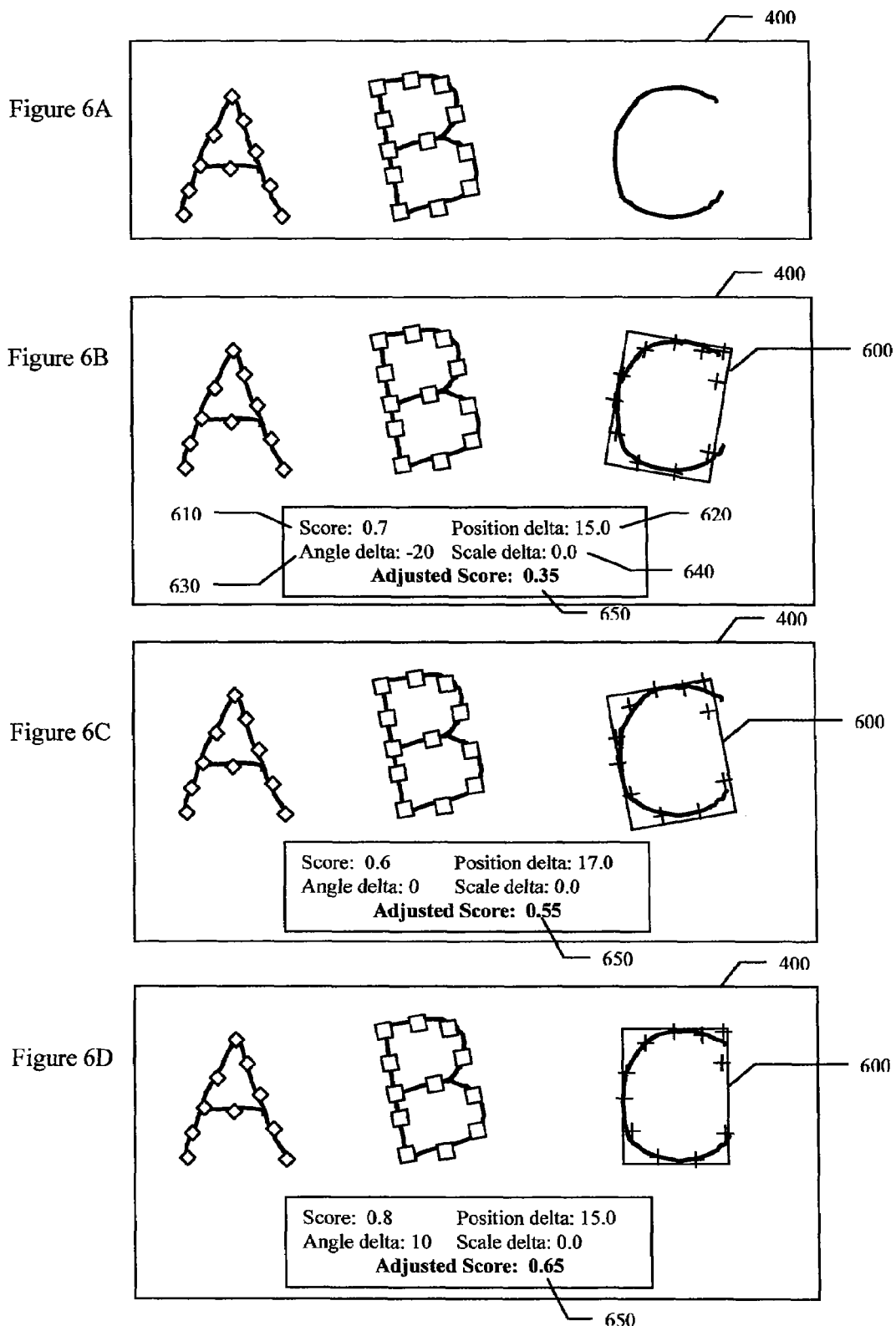

Source Points

Destination Points

Source Regions

Destination Regions

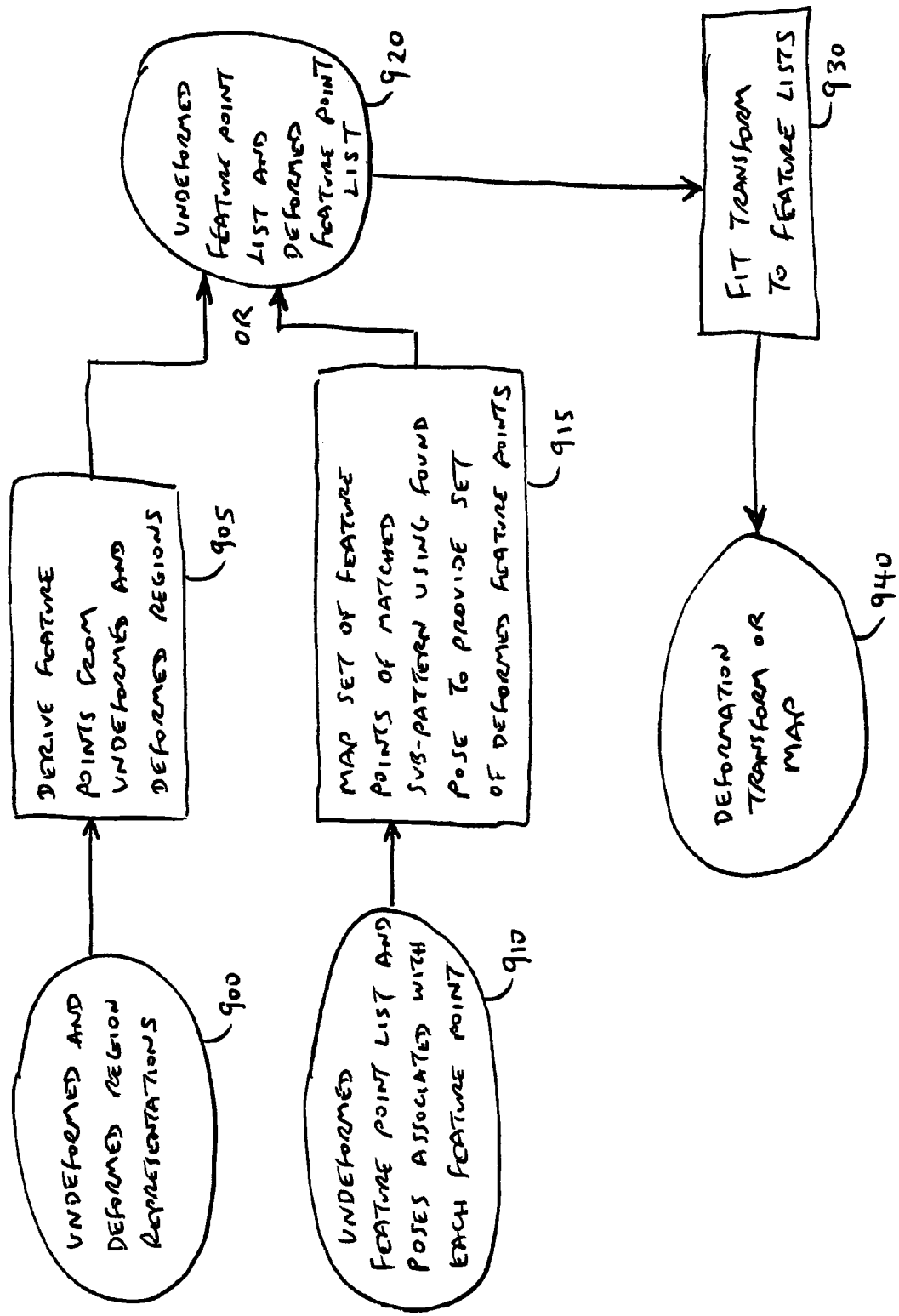

Source Points

Destination Points

Deformation Map

METHODS FOR FINDING AND CHARACTERIZING A DEFORMED PATTERN IN AN IMAGE

CROSS REFERENCE TO RELATED APPLICATIONS

This application is a continuation of U.S. patent application Ser. No. 10/625,205, entitled "Methods for finding and characterizing a deformed pattern in an image," filed Jul. 22, 2003.

FIELD OF THE INVENTION

This invention relates to machine vision systems, and particularly to methods for searching for a pattern in an image.

BACKGROUND OF THE INVENTION

The problem of how to find a particular pattern in an image is a well-known problem with many known solutions, such as feature-based search methods. Typically, the pattern is assumed to have undergone one or more of a few basic transformations, such as being scaled, or being rotated. However, these known solutions often fail if the pattern has been deformed by being warped, pulled, bent, wrinkled, damaged, or otherwise fundamentally changed from the original un-deformed shape that the search process is adapted to find.

Nevertheless, even after transformation of the whole pattern, if the deformed pattern is divided into smaller sub-patterns, those sub-patterns are themselves fairly close in form to the corresponding parts of the original un-deformed pattern. For example, if the pattern is bent into a "V" or boomerang shape, then the two legs of the boomerang both represent good, easily-findable portions of the pattern. It's only the deformed pattern that is hard to find as an entirety. Therefore, searching for a deformed pattern in an image may be facilitated by dividing the deformed pattern into smaller sub-patterns. For many typical types of deformation encountered, most of those sub-patterns are probably findable by known feature-based search methods (because the sub-patterns are not themselves substantially distorted).

However, it is then necessary for a subsequent algorithm to combine the sub-pattern search results into a full match of the distorted whole pattern. Unfortunately, searching for a large number of sub-patterns in an image takes much longer than searching for a single whole pattern. Furthermore, sub-patterns are inherently simpler than the whole pattern, so they're more likely to be confused when they are used in searching the target image, potentially yielding many spurious matches in various locations of the target image.

It is sometimes useful to characterize the deformation of the deformed whole pattern after it has been found. However, even though a deformed whole pattern has been found, a characterization of the deformation may still not be known. The deformation of the whole pattern can be characterized after each of the sub-patterns have been located. In some cases, the deformation may be easily characterized, such as the deformation due to 3D perspective, or the deformation due to the whole pattern being wrapped around a cylinder, such as when a label is wrapped around a can. In other cases, the deformation may be more atypical, representing random wrinkles, folds, bends, dents, and so forth, and is consequently not characterized by a known or standard transformation. In either case, an automated method of characterizing deformation after finding a deformed pattern would be useful in some applications, e.g., inspecting printing on soda cans, inspecting labels on oddly shaped containers such as bags of sugar, or inspecting lot and date codes on medicine bottles. With a deformation transform that maps between the deformed pattern (e.g. the logo on a full bag of sugar or the date code on a curved bottle) and the original undeformed pattern (e.g., the logo as it would appear on a flat piece of paper), tasks using inspection tools suitable for undeformed patterns can be performed, such as inspection of logo print quality. This would be impossible without a characterization, and un-doing based on the characterization, of the deformation of the bag or bottle, because wrinkles or curvature would easily be misclassified as a print defects using inspection tools suitable for undeformed patterns, even though the print quality might otherwise be acceptable.

SUMMARY OF THE INVENTION

One general aspect of the invention is a method for finding a deformed pattern in an image. The method includes providing a plurality of features that represent the deformed pattern in the image, and then dividing the plurality of features into a plurality of sub-pluralities, each sub-plurality representing a sub-pattern in the image, a plurality of the sub-patterns representing the deformed pattern. Next a distance is determined between each pair of sub-patterns of the plurality of sub-pluralities. Then, a first sub-pattern is selected to locate in the image, locating the first sub-pattern in the image so as to provide a first sub-pattern location. Next, the first sub-pattern location is used to select a second sub-pattern to locate in the image, which is then located in the image so as to provide a second sub-pattern location. The first sub-pattern location and the second sub-pattern location are then used to determine a location of the deformed pattern.

In a preferred embodiment, providing a plurality of features that represent the deformed pattern in the image includes detecting features in the image. In a further preferred embodiment, detecting features in the image includes detecting features in the image using a Sobel edge detector.

In another preferred embodiment, determining a distance between each pair of sub-patterns of the plurality of sub-patterns includes storing each distance for later use. In another embodiment, determining a distance between each pair of sub-patterns of the plurality of sub-patterns includes determining the minimum distance between the pair of sub-patterns. In yet another embodiment, determining a distance between each pair of sub-patterns of the plurality of sub-patterns includes determining the distance between a first feature of a first sub-pattern and a second feature of a second sub-pattern. In still another embodiment, determining a distance between each pair of sub-patterns of the plurality of sub-patterns includes determining the distance between a first center of a first sub-pattern and a second center of a second sub-pattern.

In a preferred embodiment, locating the first sub-pattern in the image so as to provide a first sub-pattern location includes using a feature-based search method for locating the first sub-pattern in the image. In another embodiment, locating the second sub-pattern in the image so as to provide a second sub-pattern location includes computing a search area using the location of the first sub-pattern. In an alternate embodiment, locating the second sub-pattern in the image so as to provide a second sub-pattern location includes computing an expected angle and an expected scale of the second sub-pattern.

In a preferred embodiment, the expected scale is the expected X-dimension scale and the expected Y-dimension scale. In a further preferred embodiment, an expected aspect ratio of the second sub-pattern is also computed. In another embodiment, the expected angle and the expected scale of the second sub-pattern is used so as to provide an angular search range and a scale search range. In a further preferred embodiment, the scale search range is an X-dimension scale search range, and a Y-dimension scale search range. In another further embodiment, a distance between the first sub-pattern and the second sub-pattern, and a deformation rate, is used.

In a preferred embodiment of the method of the invention, locating the second sub-pattern in the image so as to provide a second sub-pattern location includes computing a search area using the location of the first sub-pattern, and then computing an expected angle of the second sub-pattern and an expected scale of the second sub-pattern using the angle and scale of the first sub-pattern. Next, the expected angle of the second sub-pattern, the expected scale of the second sub-pattern, a distance between the first sub-pattern and the second sub-pattern, and a deformation rate are all used so as to provide an expanded search area, an angular search range, and a scale search range. Then, the second sub-pattern is located within the expanded search area, the angular search range, and the scale search range so as to provide a second sub-pattern location.

In a further preferred embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing the size of the expanded search area, the angular search range, and the scale search range upon an increase in the distance between the first sub-pattern and the second sub-pattern.

In an alternate further preferred embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing, in proportion to the deformation rate, the size of the expanded search area, the angular search range, and the scale search range. In yet another embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing, in proportion to the deformation rate, the size of the expanded search area, the angular search range, and the scale search range upon an increase in the distance between the first sub-pattern and the second sub-pattern.

In further embodiments, computing an expected angle of the second sub-pattern and an expected scale of the second sub-pattern using the angle and scale of the first sub-pattern includes computing an expected X-dimension scale and an expected Y-dimension scale using the X-dimension scale of the first sub-pattern and the Y-dimension scale of the first sub-pattern, respectively. In another embodiment, computing an expected angle of the second sub-pattern and an expected scale of the second sub-pattern using the angle and scale of the first sub-pattern includes computing an angular uncertainty and a scale uncertainty of the second sub-pattern using an angular uncertainty and a scale uncertainty of the first sub-pattern, respectively. In a further embodiment, computing an angular uncertainty and a scale uncertainty of the second sub-pattern using an angular uncertainty and a scale uncertainty of the first sub-pattern, respectively includes computing an X-dimension scale uncertainty and a Y-dimension scale uncertainty of the second sub-pattern using an X-dimension scale uncertainty of the first sub-pattern, and a Y-dimension scale uncertainty of the first sub-pattern, respectively.

Another general aspect of the invention is a method for characterizing a deformed pattern in an image. The method includes providing a plurality of features that represent the deformed pattern in the image; dividing the plurality of features into a plurality of sub-pluralities, each sub-plurality representing a sub-pattern in the image, a plurality of the sub-patterns representing the deformed pattern; determining a distance between each pair of sub-patterns of the plurality of sub-pluralities; locating a first sub-pattern in the image so as to provide a first sub-pattern location; locating a second sub-pattern in the image so as to provide a second sub-pattern location; and then using the first sub-pattern location and the second sub-pattern location for determining a deformation mapping that characterizes the deformed pattern in the image.

Another general aspect of the invention is another method for characterizing a deformed pattern in an image, wherein the method includes dividing the deformed pattern into at least a first sub-pattern and a second sub-pattern; locating the first sub-pattern in the image so as to provide a first sub-pattern pose; locating the second sub-pattern in the image so as to provide a second sub-pattern pose; and then using the first sub-pattern pose and the second sub-pattern pose for determining a deformation mapping that characterizes the deformed pattern in the image.

In a preferred embodiment, using the first sub-pattern pose and the second sub-pattern pose for determining a deformation mapping that characterizes the deformed pattern in the image includes deriving a plurality of source points from the first sub-pattern and a plurality of source points from the second sub-pattern; generating a plurality of destination points from the source points and the sub-pattern poses; and then using a transform to fit the plurality of source points and plurality of destination points so as to create the global deformation map. In preferred embodiments, the transform is a perspective transform, or is an affine transform, or is a spline transform, or is a thin-plate spline transform, or is a cylinder transform.

In further embodiments, the transform is fit using a least-squares-fit method, or a Total Variation method, or a Robust M-estimators method, or a Minimum $L_p$-Norm Estimation, or a Least Median of Squares method. In other embodiments, the first sub-pattern and the second sub-pattern each include a plurality of feature points. In yet other embodiments, the first sub-pattern and the second sub-pattern each include a region. In a preferred embodiment, each region is converted into feature points. In further preferred embodiments, each region is converted into feature points by representing each sub-pattern as a region having a boundary and interior area, and then selecting a plurality of boundary points along the boundary. In a yet further preferred embodiment, the boundary points include corners. In an alternate embodiment, the boundary points include a point midway between two vertices of the boundary.

In another preferred embodiment, deriving a plurality of source points from the first sub-pattern and a plurality of source points from the second sub-pattern includes representing each sub-pattern as a region having a boundary and an interior area, and then selecting at least one interior point. In another preferred embodiment, deriving a plurality of source points from the first sub-pattern and a plurality of source points from the second sub-pattern includes representing each sub-pattern as a region having a boundary and an interior area, and then selecting a plurality of boundary points along the boundary. In a further embodiment, the boundary points include corners. In another embodiment, the boundary points include a point midway between two vertices of the boundary.

In another preferred embodiment, dividing the deformed pattern into at least a first sub-pattern and a second sub-pattern includes dividing the deformed pattern in the image into a plurality of contiguous rectilinear regions so as to form a grid that extends over at least most of the deformed pattern, thereby providing at least a first sub-pattern and a second sub-pattern; and then deriving a plurality of source points from at least the first sub-pattern and the second sub-pattern.

In yet another preferred embodiment, deriving a plurality of source points from the first sub-pattern and a plurality of source points from the second sub-pattern includes representing each sub-pattern as a plurality of feature points, and then sub-sampling the plurality of feature points so as to reduce the number of feature points in each sub-pattern.

The method of the invention effectively restricts sub-pattern search ranges, which both improves search speed and reduces the number of spurious matches. The method of the invention also quickly decides which sub-patterns, out of several potential candidates, is most likely to correctly match a deformed sub-pattern.

The deformation characterization method of the invention uses results from feature-based search tools (typically the "pose" of each sub-pattern of a deformed whole pattern, the pose including position, angle, x-dimension scale, and y-dimension scale information, for example) to create a mapping that models the deformation of the pattern in the image. A transform, selectable by a user, is fit to the results from the feature-based search tools to create a global deformation mapping. This transformation is fit only to feature points derived from matches resulting from successful sub-pattern search, without including data from areas of the pattern that were blank, not matched, or otherwise didn't contain information about the pattern's distorted location.

BRIEF DESCRIPTION OF THE DRAWING

The invention will be more fully understood by reference to the detailed description, in conjunction with the following figures, wherein:

FIGS. 6A-6D show a target image of a pattern having three sub-patterns, illustrating multiple matches for one of the three sub-patterns and their associated scores;

FIG. 9 is a flow chart of an embodiment of a method for characterizing deformation of a pattern;

DETAILED DESCRIPTION

Figure 1:
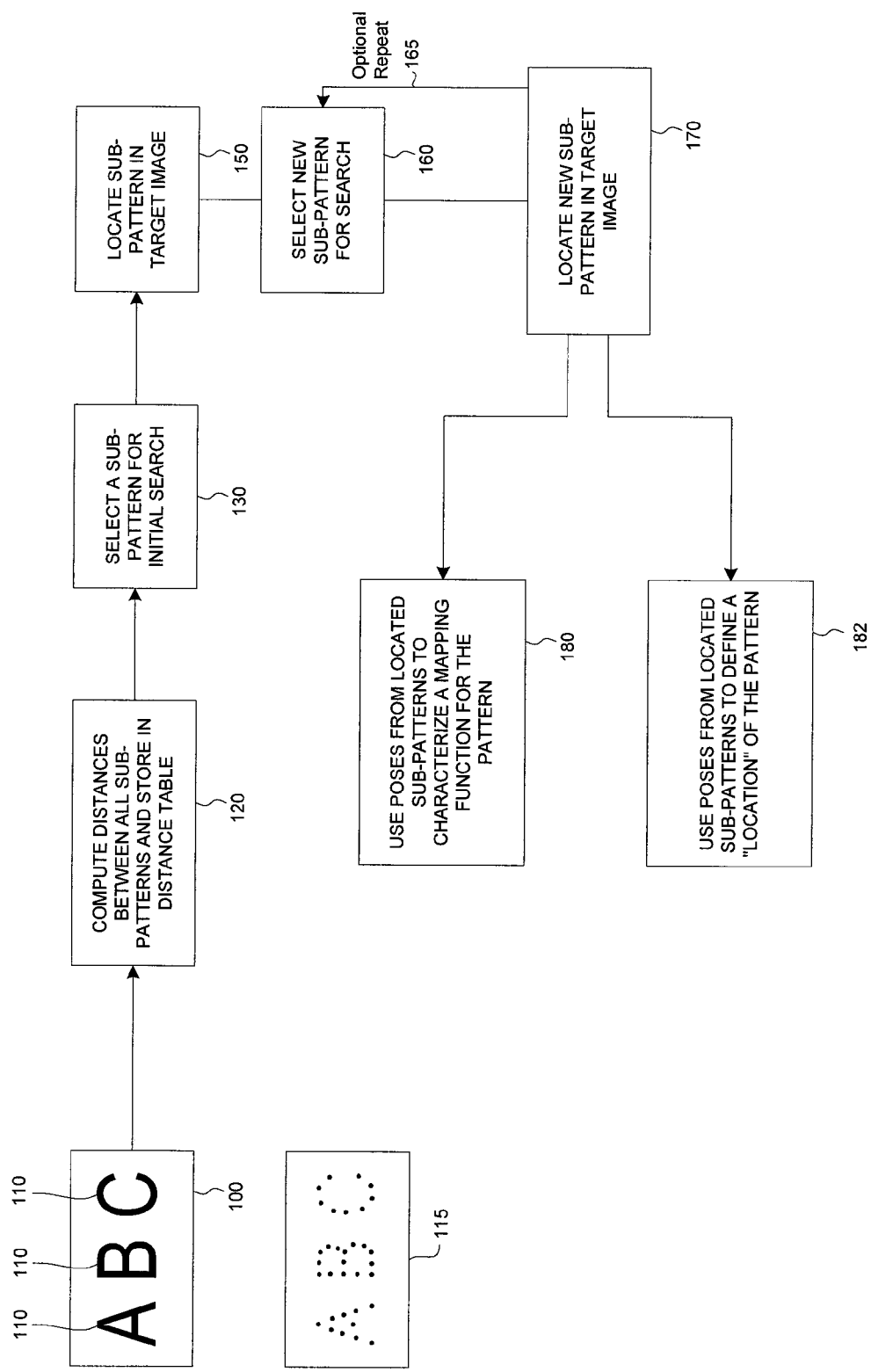
FIG. 1 is a flow chart of an embodiment of the method of the invention.
Figure 2A:
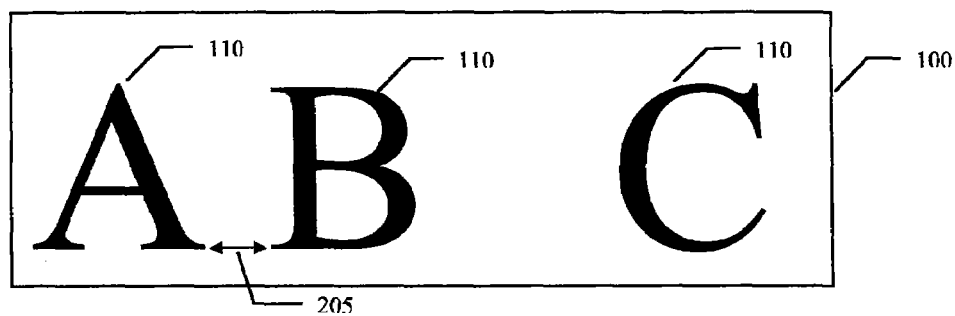
FIG. 2A is an example of a target image having a pattern to be analyzed by the method of the invention, the pattern having three sub-patterns.
Figure 2B:
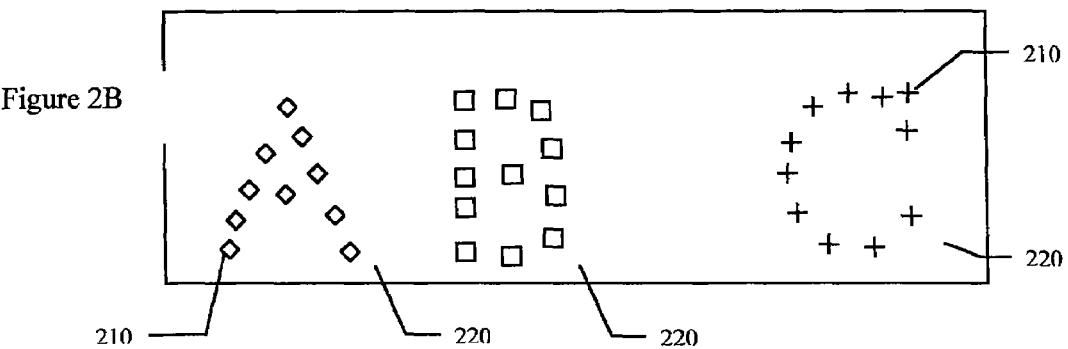
FIG. 2B is a collection of feature points derived from the pattern of FIG. 2A.

Referring to FIGS. 1 and 2, this method takes as input a target image having a pattern to be analyzed 100 (the letters A, B, and C, taken together), which is partitioned into a set of two or more sub-patterns 110 (the letters A, B, C; individually). These sub-patterns 110 are selected to be "spatially coherent" (a coherent sub-pattern tends to contain areas of the image that are connected to each other, and tends not to contain areas that aren't connected. For example, the region of the image where the "A" lies in FIG. 2A is connected by virtue of being part of the "A", so that would tend to be one coherent sub-pattern, but elements of the "B" would not be included because there is a gap such as in 205 between those elements), such that each sub-pattern 110 represents a particular region of the main pattern, and together the sub-pattern regions cover the majority of the area of the larger pattern 100 where pattern information, such as boundaries between light and dark regions, is found. In one embodiment, to obtain a plurality of spatially coherent sub-patterns, the main pattern is divided into rectangles by a grid, where each sub-pattern covers the area spanned by a rectangle.

In a preferred embodiment, to obtain more spatially coherent sub-patterns, the main pattern is converted into feature points 210 by any method known in the art, such as by using a Sobel edge detector, where each feature point represents a point of pattern information, such as a point along a brightness boundary (i.e., an edge) within the image. These feature points are then clustered into sub-groups 220 using any known partitioning algorithm, such as simply dividing the points into groups by applying a regular grid to partition the area, or other clustering algorithm, such as the well-known "nearest-neighbor" or "k-means" clustering methods. Each clustered group then represents a sub-pattern. In another preferred embodiment, the feature points are clustered into sub-groups using the methods taught in co-pending U.S. patent application entitled "METHOD FOR PARTITIONING A PATTERN INTO OPTIMIZED SUB-PATTERNS", filed Jul. 22, 2003. In another preferred embodiment, these feature points 115 are provided directly as inputs, in lieu of the image 100.

These feature points 115 need not be restricted to two-dimensional (2D) points. One skilled in the art can readily see that a pattern can be represented in any number of dimensions, for example 3D, with no change to this method. However, 2D points and 2D images are used as example images herein for ease of representation.

Next, in step 120, distances are computed between each pair of sub-patterns 110. These distances are stored in a look-up table for later use, in a data storage entity hereinafter referred to as the "distance table". In one embodiment, shown in FIG. 2A, the distance 205 between a pair of sub-patterns 110 is the minimum distance between any points within the regions represented by the two sub-patterns 110.

Figure 3A:
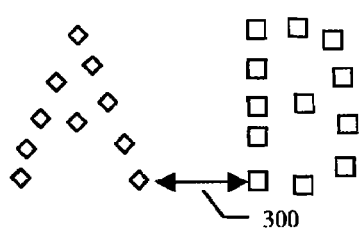
FIG. 3A shows a pair of sets of feature points that illustrates the distance between sub-patterns as the minimum distance between any two feature points of each sub-pattern.
Figure 3B:
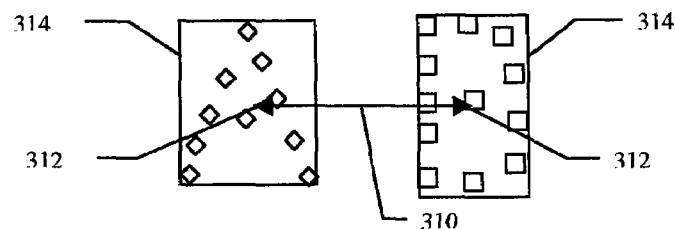
FIG. 3B shows a pair of sets of feature points each within a bounding box that illustrates the distance between sub-patterns as the distance between the centers of the bounding boxes of sub-patterns.
Figure 3C:
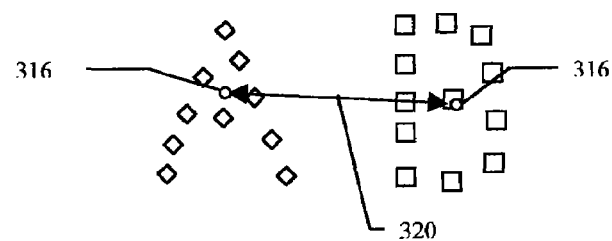
FIG. 3C shows a pair of sets of feature points each having a computed "center-of-mass" that illustrates the distance between sub-patterns as the distance between the centers-of-mass.

In an alternate embodiment shown in FIG. 3A, the minimum distance 300 computed is between any two features within the sub-patterns, if the sub-patterns are represented by features. In another embodiment shown in FIG. 3B, this distance is the distance 310 between the two centers 312 of the bounding boxes 314 of the two sub-patterns shown in FIG. 3B. In a preferred embodiment shown in FIG. 3C, the distance 320 is computed between the so-called "centers of mass" 316 of the two sub-patterns, where the center of mass is the average of the positions of all features in the sub-pattern.

Figure 4A:
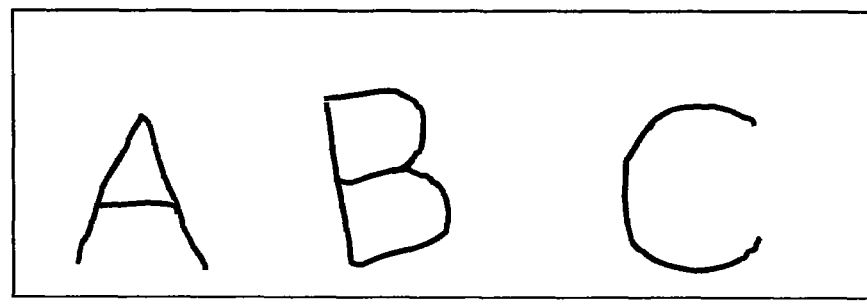
FIG. 4A is an example of a target image of a pattern having three sub-patterns.
Figure 4B:
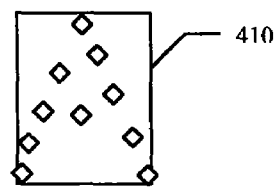
FIG. 4B is a set of features of a sub-pattern to be located within the target image of FIG. 4A.

In step 130 a sub-pattern is selected for initial search. Referring to FIG. 4B, this sub-pattern 410 must be located in a target image 400 of FIG. 4A without the benefit of any additional information as to where exactly it might be, because it is the first sub-pattern searched. Therefore, this initial sub-pattern 410, or "anchor" pattern, should be chosen so as to maximize "findability" in an image, relative to the other potential sub-patterns. To maximize findability, the method of the invention scores all sub-patterns according to a criterion or set of criteria, and chooses the highest-scoring sub-pattern as the anchor pattern. In one embodiment, the score is the area of the region covered by the sub-pattern. In another embodiment, the score is the number of feature points in the sub-pattern. In another embodiment, the score is based on proximity to other sub-patterns computed with the same distance metric discussed above in reference to 300, 310, and 320, where a sub-pattern that is near many other sub-patterns scores relatively high. In a preferred embodiment, the utility of each sub-pattern as a search pattern ("findability") is judged by using that sub-pattern to do a search on the initial pattern, if available. A sub-pattern scores higher if it provides only a single good match, and does not result in extra matches in other locations of the image, or at other orientations, scales, etc. With this embodiment, a circle, for example, would not be considered a good pattern, because it would yield multiple matches at different angles, since a circle looks the same when rotated in place. In another preferred embodiment, several or all of these scoring methods are combined to give a master score, either by simply adding scores together, or by weighting them and then adding them (where the weights would be chosen according to whatever works best empirically for the particular search method used), or by multiplying them together, or by any other reasonable method for combining multiple scores.

Per step 150 of FIG. 1, the anchor pattern 410 is sought in the target image 400 (also 140 in FIG. 1) using any known feature-based search method that finds a pattern despite changes in appearance, such as changes in position, x-dimension scale, y-dimension scale, aspect ratio, angle, or other degrees of freedom (D.O.F), even including generalized deformation. Such pattern search methods include feature-based search methods, including some "geometric" search methods. See, for example, "A Feature-Based Image Registration Algorithm Using Improved Chain-Code Representation Combined with Invariant Moments", IEEE Trans. on Geoscience and Remote Sensing, Vol. 37, No. 5, September 1999, and "Multiresolution Feature-Based Image Registration", Visual Comm. and Image Processing 2000, Proceedings of SPIE vol. 4067 (2000), pp. 1490-1498, Perth, Australia, 20-23 Jun. 2000. The anchor pattern 410 is searched for over a range of angles, scales, etc., the range being based on a pre-determined or user-provided deformation rate estimate, which estimate indicates how much local deformation may occur to the pattern. A larger deformation rate estimate means that the anchor pattern may be dissimilar from versions that may be present in the target image, and therefore a larger range of angles, scales, etc. should be used to search for the anchor. For example, the user may indicate that the search should be done over an angle range of −10 to +20 degrees, in the case of a large deformation rate estimate. The actual search range would then be expanded by, for example, 70%, resulting in a search range of −17 to +34 degrees. For another example, a smaller deformation rate estimate might instead expand the range by only 20%, resulting in a search range of −12 to +24 degrees. Similar increases in range occur for each available degree of freedom, such as x-dimension scale, y-dimension scale, aspect ratio, etc.

If the chosen anchor pattern 410 is not found within the target image 400 at step 150, or if it is found but the remaining search steps 160, 170, 172-178 are unsuccessful in matching the rest of the pattern, a different anchor pattern is selected using the same methods described above, except the next-highest scoring sub-pattern is chosen instead of the failed sub-pattern. If no anchor pattern is ever found within the target image 400, even after a plurality of attempts 165, the method is deemed to have failed to locate the main pattern in the image, and consequently it cannot characterize the deformation of the pattern 180. In this case, either the deformation was too extreme to allow the pattern 410 to be found with the method of the invention, or the user-supplied deformation-rate estimate was too low, or the pattern 410 was not in fact present in the image 400 at all.

Figure 4C:
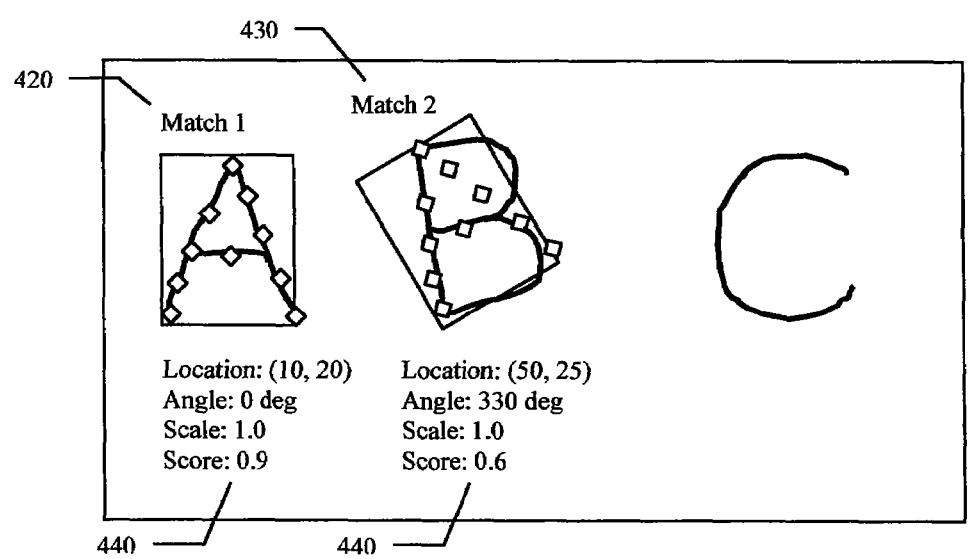
FIG. 4C is an illustration of two matches of the set of features of the sub-pattern to be located within the target image of FIG. 4A, with the match data for each of the two matches.

Referring to FIG. 4C, if more than one occurrence 420 430 of the anchor pattern 410 is found in the target image 400, the highest scoring match 440 (e.g., Match 1) is used first for the rest of the steps 160, 170, 172-178, 180, according to the value of the scoring function which depends on whatever search method was used. If subsequent patterns cannot be successfully matched using the highest scoring match by the rest of the steps set forth below 160, 170, 172-178, 180, the steps 160, 170, 172-178, 180 are repeated for each anchor match, in order of decreasing score.

Referring to FIG. 1, at step 160, to select a next sub-pattern to search, the remaining sub-patterns not including the anchor pattern 410 are then scored. In one embodiment, the score is the area of the region covered by a sub-pattern. In another embodiment, the score is the number of feature points in a sub-pattern. A preferred embodiment uses the distance (as previously computed above) between the anchor pattern and the associated sub-pattern, with smaller distances scoring higher—that is, the sub-pattern nearest to the anchor pattern will be chosen. A refinement to this embodiment gives higher scores to sub-patterns that are near more than one previously found pattern, if such patterns exist. The reason for this is that having more than one previously located, or "anchored", pattern nearby increases the confidence in the expected location of the new sub-pattern, as there are a larger number of successfully matched features in the immediately surrounding area, reducing the potential for unexpected deformation. A key assumption here is that as the search area moves away from regions with found matches, the potential for deformation increases, as even small, consistent deformations (such as a line of text printed on a curved path) add up to large deformations across a large gap. In another preferred embodiment, several or all of these scoring methods are combined to give a master score, either by simply adding scores together, or by weighting them and then adding them (where the weights would be chosen according to whatever works best empirically for the particular search method used), or by multiplying them together, or by any other reasonable method for combining multiple scores.

At step 170, the highest-scoring sub-pattern is searched for in the target image 400, again using any search method known in the art that finds patterns in the presence of some sort of distortion, including but not limited to distortion of position, angle, x-dimension scale, y-dimension scale, etc.

Figure 1A:
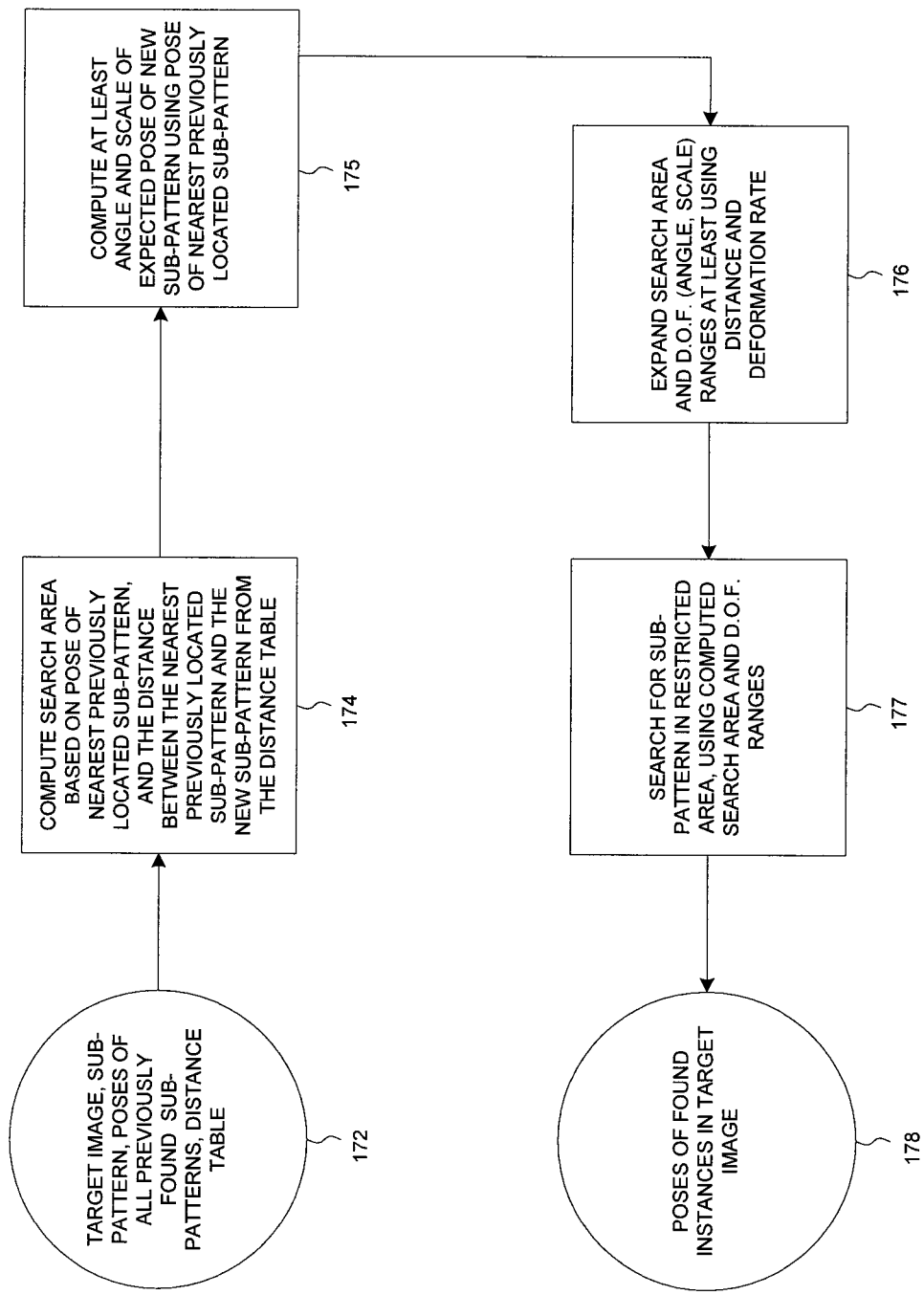
FIG. 1A is a flow chart of an embodiment of a step 170 of FIG. 1.
Figure 5A:
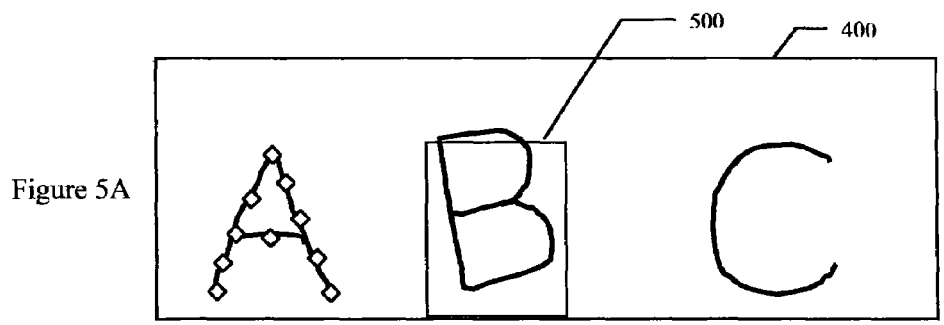
FIGS. 5A-5E show a target image of a pattern having three sub-patterns, one sub-pattern serving as a "local anchor"
Figure 5B:
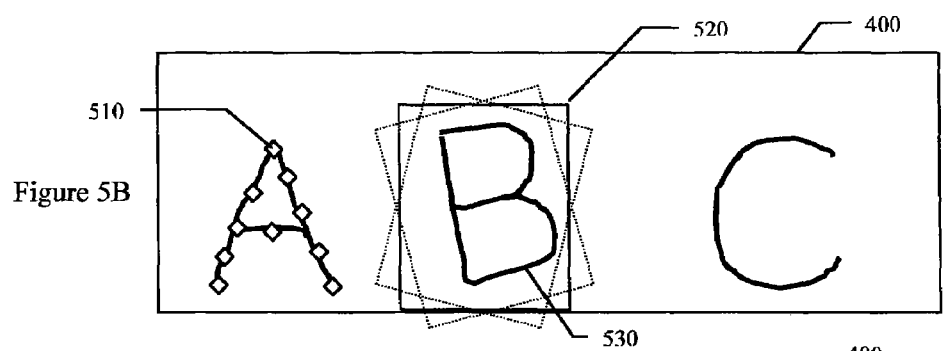
Figure 5C:
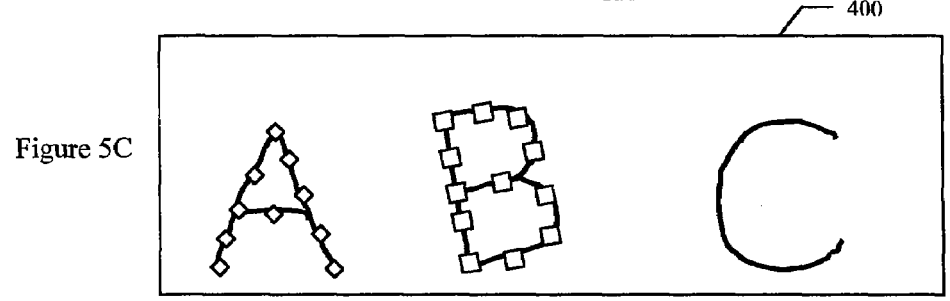

With reference to FIGS. 1A and 5A, the search range of this sub-pattern search 170 is restricted, which allows the search 170 to run in less time than a full search of the image 400, and which also reduces the possibility of spurious matches by tending to exclude them from the search range. Inputs 172 to the sub-pattern search 170 include the target image 400, sub-pattern to be located (for example, 410), locations of all previously found sub-patterns (for example, see FIG. 4C), and the distance table. The distance table is the list of distances between all pairs of sub-patterns that was computed in 120. The initial search ranges are based on the expected position 500 of the sub-pattern in the image, with a small amount of leeway added to the range to deal with incidental deformation 174. Since the pattern is assumed to be deformed in the target image, we must assume that sub-patterns will have small deformations as well. By increasing the ranges by a small amount, we increase the likelihood that the entire sub-pattern will be found within the search area, despite this extra deformation. Examples of this leeway include setting the size of the search window to be the size of the sub-pattern's nominal bounding box 500, plus three extra pixels on each side to account for the possibility of ink bleeding in a printed image, or similarly searching at plus or minus three degrees of angle from the nominal angle, though of course other values can be used that may further optimize a particular application of the method of the invention.

In step 176, the initial search ranges for those various degrees of freedom (e.g., search area, angle, scale) are then modified based on a number of factors. In one preferred embodiment, the initial search ranges are expanded further based on the user-provided "deformation rate estimate", where higher rates increase the ranges more. For example, an estimate of high deformation, arbitrarily chosen as 0.8 for this example, could result in an expansion of a nominal angular search range from 40 to 60 degrees to 20 to 80 degrees, while an estimate of low deformation, such as 0.2, could result in an expansion of the angular search range to only 35 to 65 degrees. In a further preferred embodiment, the deformation rate estimate is multiplied by the distance between the current sub-pattern and the nearest previously located sub-pattern (called the "local anchor") 510 560. This results in larger search area ranges 570 for sub-patterns 580 that are further away from any known, "locally-anchored" regions 560 in the target image 400, and smaller search area ranges 520 for sub-patterns 530 that are closer to a known local anchor 510. In the embodiment, described above, where sub-patterns are chosen for searching based on the distances to more than one previously located sub-pattern, those distances can be combined here. If the nearby sub-patterns do not agree on the likely pose of the new sub-pattern, that is evidence that deformation to the pattern has occurred (as otherwise all sub-patterns would be found right where they're predicted to be anyway), so therefore the deformation estimate should be increased, to encompass the expected ranges from all nearby sub-patterns. In the embodiment of step 175, the position, as well as the angle, x-dimension scale, y-dimension scale, and other degrees of freedom of the local anchor 560 are used to determine the nominal, or expected, pose of the sub-pattern 550—the sub-pattern search is based on the assumption that the most likely place for the new sub-pattern is where it would be found if it had exactly the same sort of distortion (angle, scale, etc.) as its local anchor 560.

Figure 5D:
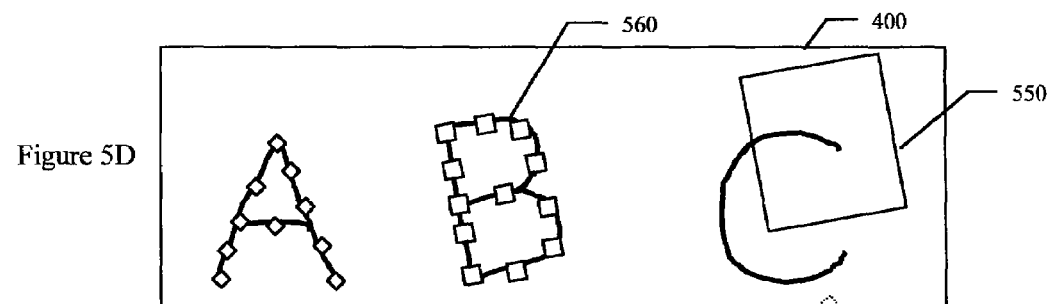
Figure 5E:
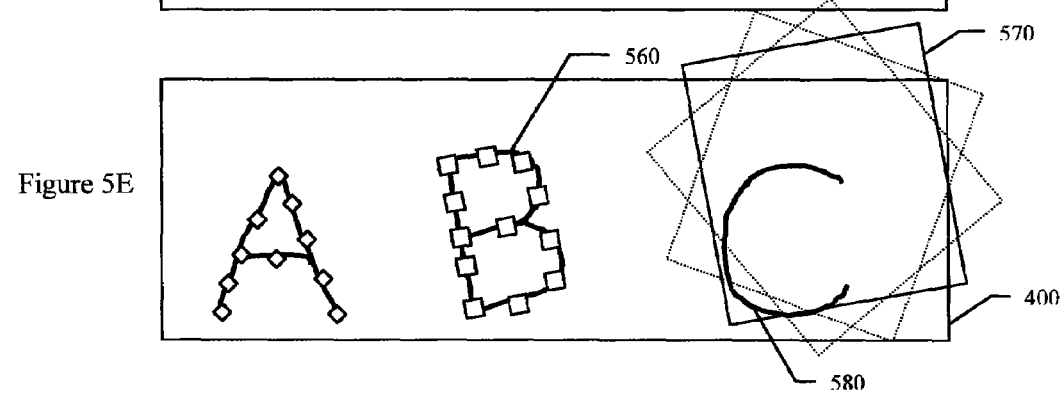
Figure 7A:
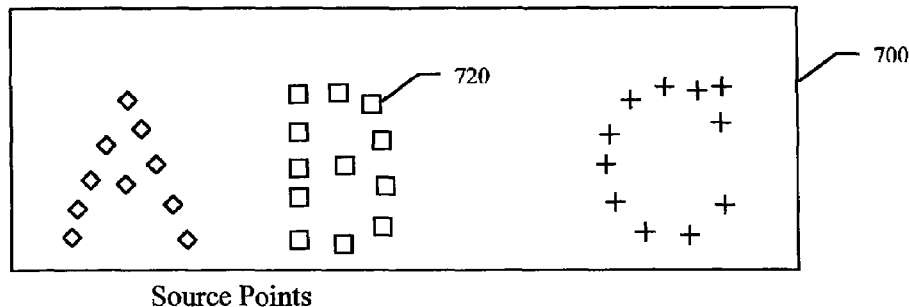
FIG. 7A shows three sets of source feature points corresponding to a pattern having three sub-patterns.
Figure 7B:
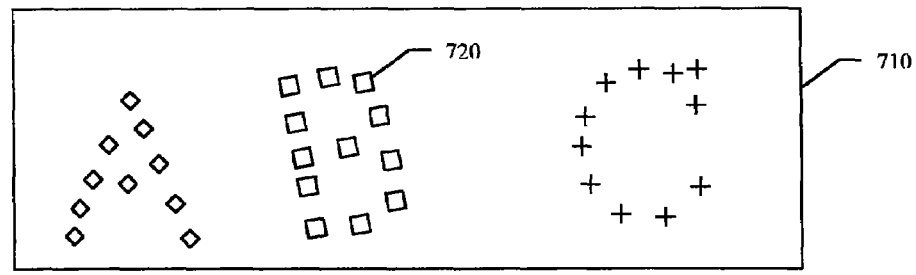
FIG. 7B shows three sets of destination feature points corresponding to a pattern having three sub-patterns.
Figure 7C:
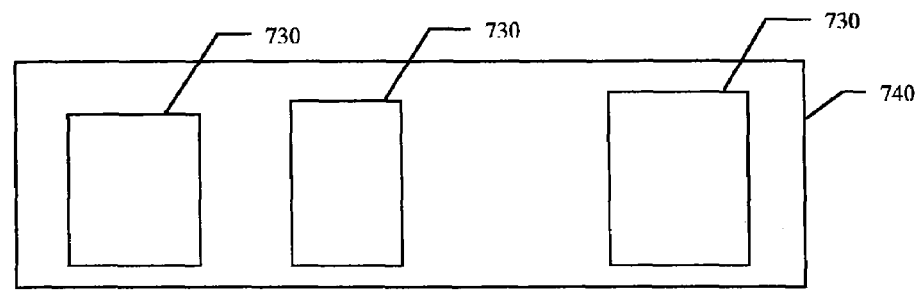
FIG. 7C shows three source regions corresponding to a pattern having three sub-patterns.
Figure 7D:
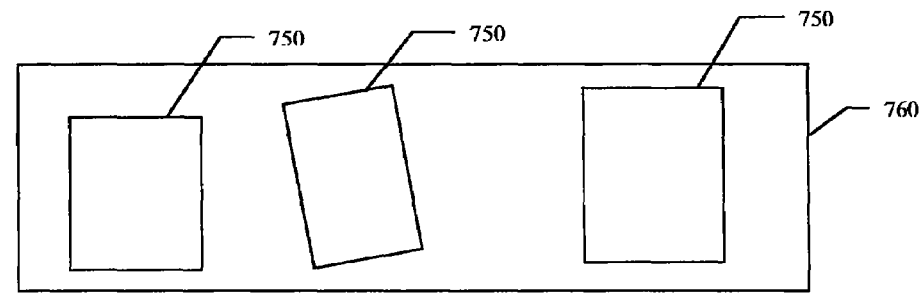
FIG. 7D shows three destination regions corresponding to a pattern having three sub-patterns.

Another embodiment varies the D.O.F. search ranges based on the score obtained by the search for the local anchor, as the score is considered to be a measure of certainty, and when the local anchor's pose is uncertain, the search ranges for nearby sub-patterns can be advantageously enlarged 570, as shown in FIGS. 5D and 5E. A further preferred embodiment uses all of these factors to modify the D.O.F. search ranges. Another preferred embodiment further uses more than one local anchor, if more than one exists, and combines the search ranges determined using each local anchor to determine an overall set of D.O.F. search ranges. This last embodiment is particularly useful when the deformation is not smooth, and several nearby sub-patterns might have different types of distortion. In that case, the new sub-pattern might be distorted similarly to any of the known sub-patterns, so including all of those potential distortions in the search range is important, though there is of course a speed cost in the search over the widened ranges. An important benefit of the method of the invention is to maximize the likelihood that the D.O.F. search range includes the instance of the sub-pattern in the target image 530 580, even though that instance may not be where it's expected to be, while also minimizing the computational overhead of the search by limiting D.O.F. search range to some D.O.F. range that is less than the maximum possible range in each D.O.F., such as less than the whole image area in the spatial D.O.F., less than 360 degrees in the angular D.O.F., etc.

Referring to FIG. 1A in step 177, a search is performed for any matches of the sub-pattern 600 using the limited D.O.F. search ranges. If there is more than one match of this new sub-pattern 600, shown in FIGS. 6B-6D, score the matches and choose the highest scoring one. In one embodiment of this scoring function, the score is simply the score 610 indicating a measure of match quality returned by the underlying search algorithm. In another embodiment, the score is determined based on the match's similarity to the expected match location given the local anchor. That is, if the match is at the position 620, angle 630, scale 640, etc. that would be expected if the only distortion was that given by the local anchor's pose, it scores higher. The further away a degree-of-freedom gets from any of these expected (or nominal) values, for example by being translated, rotated, or scaled differently than the anchor, the lower the score gets.

An actual score can most easily be computed by looking at how far away each D.O.F. value is from the expected value, relative to the possible range, and expressing that as a ratio. For example, if the expected angle was 20 degrees, and the search range was 10 to 30 degrees, then if the match angle was at 16 degrees, then the score would be 1.0−(20−16)/(20−10)=1.0−0.4=0.6. If the match angle was at 12 degrees, the score would be 1.0−(20−12)/(20−10)=1.0−0.8=0.2. Subtracting the ratio from 1.0 causes high scores to indicate better matches than low scores, which is what is preferred. A preferred embodiment combines both of these scoring methods into a single score 650, either by multiplying them together, or by adding them, or by any reasonable scheme for combining multiple score values into a single score.

Referring to FIGS. 1 and 1A, whether or not any matches were actually found at step 178 of step 170, the method then repeats 165 the sub-pattern search described above, not searching for previously found sub-patterns, until searches have been performed for all sub-patterns in the original set of sub-patterns 110160. On each subsequent iteration 165, the step that selects the next sub-pattern for search 160, as described above, does not select the best-scoring sub-pattern considering only a single anchor pattern, but rather it selects it considering all of the previously found sub-patterns. That is, the candidate sub-patterns are scored against all "anchored" sub-patterns, and the best score determines which will be the next sub-pattern selected 160.

After the various parts of the target pattern 400 have been individually located in the image, an aggregate score for the match is computed based on the sub-pattern quality scores (already computed as described above 650), where non-located sub-patterns score as zero. In one embodiment, the scores of the sub-patterns are simply averaged. In a preferred embodiment, these sub-scores are combined as a weighted average, being weighted according to the area enclosed by the features of each sub-pattern, or by the size of the bounding-box. In another preferred embodiment, they are weighted by the number of features in each sub-pattern.

This aggregate score is returned, or a failure message is returned if the pattern could not be matched. The individual poses of the sub-pattern matches can also be returned, and also the individual sub-scores corresponding to the individual poses.

In a preferred embodiment, the individual poses of the sub-pattern, and the exact found positions of individual features in each sub-pattern are used to define a deformation map 180, and that deformation map can be returned as output, either instead of or in addition to other match information. In a refinement to that embodiment, the feature information used to help define the deformation map is a sub-set of the feature points provided by prior steps of the method for finding a deformed pattern. For example, the set of feature points can be sub-sampled, resulting in a less accurate result (as fewer features are considered), but then the deformation map can often be computed much faster from fewer features In another refinement, these points are a representative sampling of the region that each sub-pattern occupies, such as the corners or edges of the bounding box of the region, or a set of points along whatever contour may define the region. In a preferred refinement to this embodiment, individual feature points that were not matched as part of the core search for a deformed pattern are omitted from the list of feature points used to create the deformation map 180. The location or pose of the pattern in the image is returned 182 by the method of the invention, though the exact concept of "location" or "pose" for a deformed pattern permits a variety of definitions, the particular definition being chosen in accordance with the requirements of a particular application, or the convenience of a user or developer. In one embodiment, the location of the pattern is deemed to be the location of a particular designated "location point" in the pattern, the location point being designated by a user. In this embodiment, the returned location is the "location point" mapped through the above-described deformation map, which is a close approximation to the location of that point in the deformed pattern. In another embodiment, the pose of the pattern is deemed to be the location of a user-specified sub-pattern. In this case, the location includes the full pose of the sub-pattern (which was determined by the method of the invention), not just the position information. In another embodiment, the pose is computed by fitting an affine transform to all found feature points using any standard method for fitting such a transform, such as a least-squares fit, or other fitting methods disclosed herein. This yields only a rough approximation of the location of the pattern, as all deformation has been stripped away. However, for patterns that have only minor deformation, this may be the simplest solution. In a preferred embodiment, the deformation map itself is returned, as this map contains the most detailed information available on the pattern's position in the image. In this embodiment, the user can define "location" any way they choose by using the information provided by the deformation map. For example, they could map the four corners of the pattern rectangle through the deformation map to yield a "location quadrilateral" for the deformed pattern.

Method for Characterizing Deformation of a Pattern

Figure 10A:
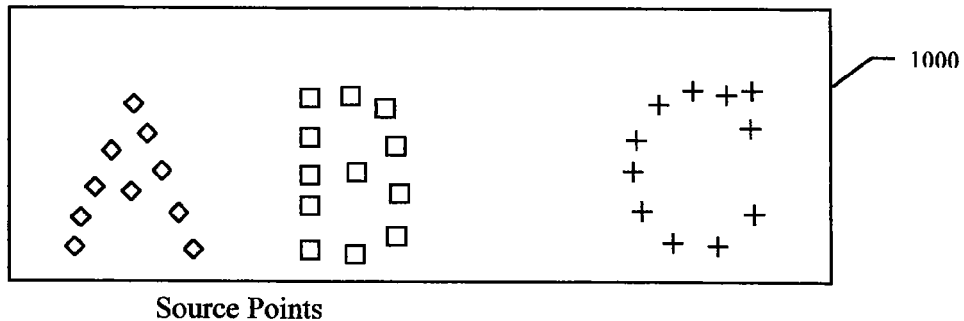
FIG. 10A shows three sets of source feature points corresponding to an undeformed pattern having three sub-patterns.
Figure 10B:
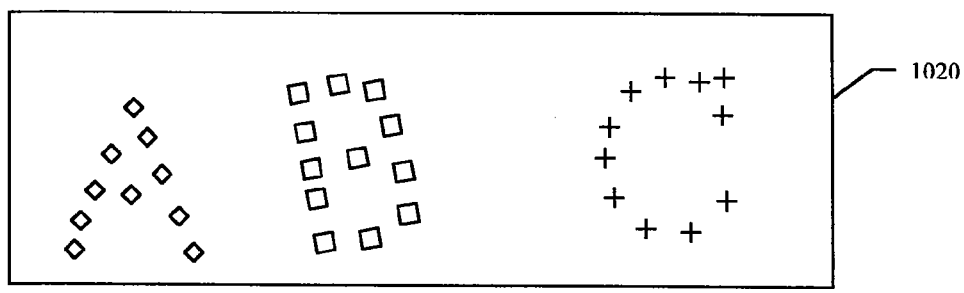
FIG. 10B shows three sets of destination feature points corresponding to a deformed version of the pattern of FIG. 10A.
Figure 10C:
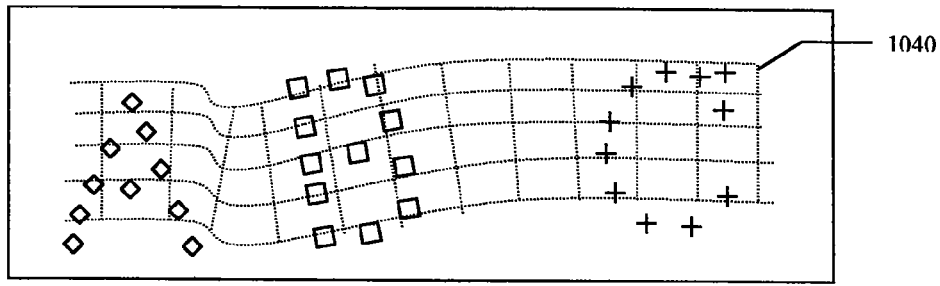
FIG. 10C is a deformation map of the deformation of the deformed pattern of FIG. 10B.

Referring to FIGS. 7, 9, and 10, to define a deformation map 1040 as shown in FIG. 10C, a set of feature points representing an un-deformed pattern 700, 1000, and a corresponding set of feature points representing the deformed pattern 710, 1020 are used 920. Each feature point 720 represents a point of information in the pattern or image 700, 710, such as a point along a brightness boundary within the image 700, 710. These corresponding sets of feature points 700, 710 can be determined by any method known in the art, including but not limited to the search method of the invention described herein above.

The above-described search method of the invention employs sub-patterns that each include a plurality of feature points which can be input directly as "undeformed pattern" points 700. The above-described search method of the invention also provides a found pose for each matched sub-pattern 910. Mapping each matched sub-pattern's set of feature points through the found pose gives a set of "deformed pattern" feature points 915 to be used as input to the method disclosed herein for characterizing the deformation of a pattern.

Alternatively, a set of source regions 730 can be used as initial inputs 900. The set of source regions 730 together represent an un-deformed pattern 740, and a corresponding set of regions 750 represent a deformed pattern 760. An example of a set of source regions is a grid of rectangles that cover the full area of an un-deformed pattern, and a corresponding set of destination regions is a collection of contiguous affine rectangles (e.g., rectangles that have undergone rotation, skew, scaling, and/or translation) that represent the approximate deformations of the rectangles of the grid.

Figure 8A:
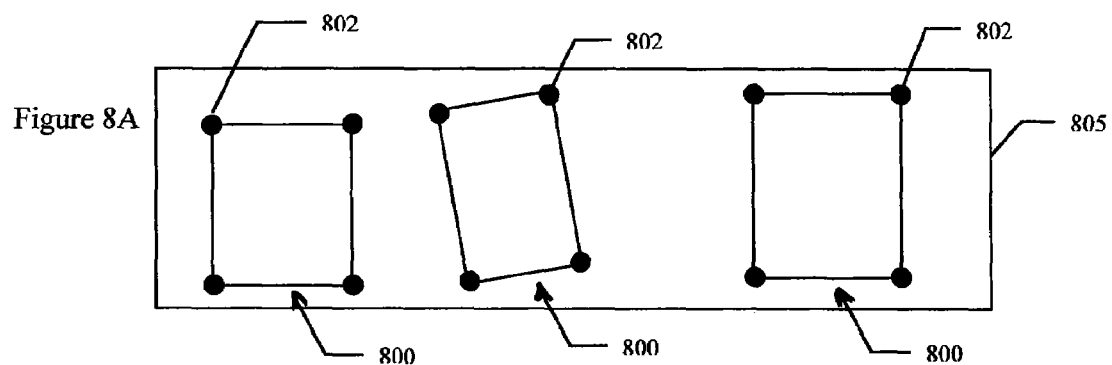
FIG. 8A shows three sets of feature points corresponding to a pattern having three sub-patterns, the feature points being corners of bounding shapes of the three sub-patterns.
Figure 8B:
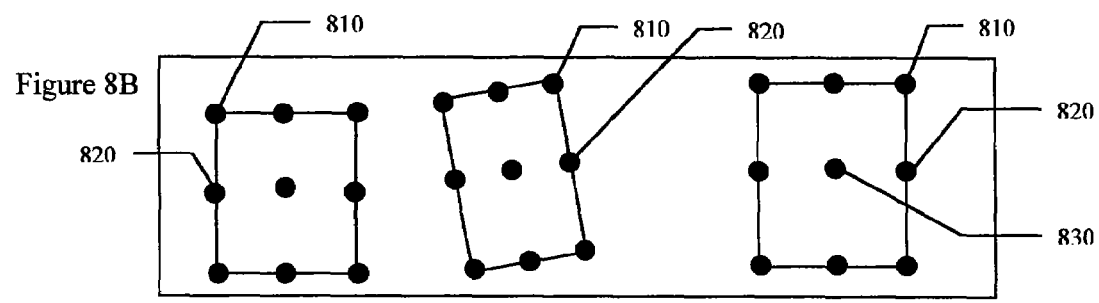
FIG. 8B shows three sets of feature points corresponding to a pattern having three sub-patterns, the feature points being corners of bounding shapes, centers of bounding shapes, and mid-points of the vertices of the bounding shapes.
Figure 8C:
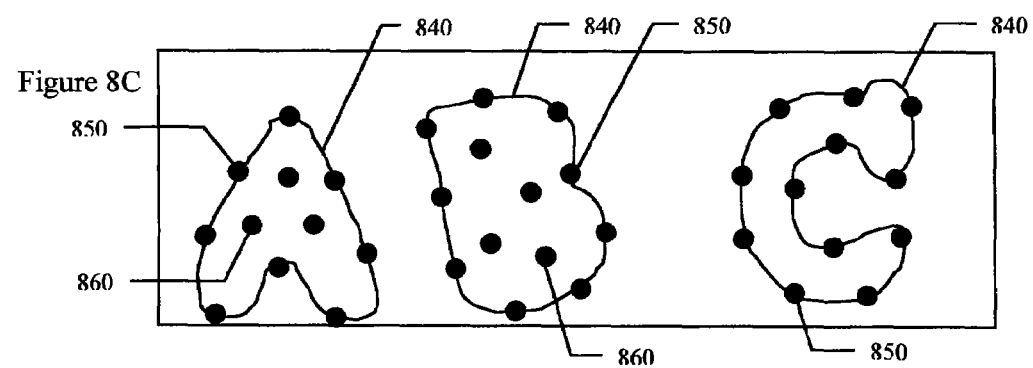
FIG. 8C shows three sets of feature points corresponding to a pattern having three sub-patterns, the feature points being a sampling of points along a bounding contour, and along an interior contour.

Referring again to FIGS. 8 and 9, to use the regions 900, a list of feature points 920 is created from the source regions and destination regions by any reasonable method 905. For example, in one embodiment illustrated in FIG. 8A, where the regions are rectangles or other regular shapes 800 in the image 805, the feature points are the corners (vertices) 802 of the shapes 800. In another embodiment shown in FIG. 8B, where the regions are again rectangles or other regular shapes, the feature points are a representative sampling of points within and along the shapes, such as the corners (vertices) 810, the centers (midpoints) of the sides 820, and the center of the shape 830 (or any defined interior point). In another embodiment, set forth in FIG. 8C, where the regions are more general contours 840, a sampling of points along the contour 850, or within the shape itself 860, are used.

A global deformation map 1040 as shown in FIG. 10C is then created by fitting a transform 930 to the set of source 1000 and destination 1020 points 920, using any standard method of fitting known to those skilled in the art, such as a least-squares fit, a least median of squares fit, a minimum $L_p$ norm estimation, a robust m-estimators fit, or a total variation fit. Also, some transforms, such as the "thin-plate spline" discussed below, can map the points exactly without relying on the approximate solution provided by a "fitting" method. In one embodiment, this deformation map 1040 is an affine map. If the deformation of the pattern is known to be solely or primarily perspective distortion, then a preferred embodiment is to fit a perspective transform to the points. If the deformation of the pattern is known to follow the curve of a cylinder, for example if the pattern were printed on a metal can, a generic cylinder or conic transform is used.

A preferred embodiment for accurately modeling more detailed deformation is the thin-plate-spline, a mathematical construct described in "Principal Warps: Thin-Plate Splines and the Decomposition of Deformations" by Fred L. Bookstein (IEEE Transactions on Pattern Analysis and Machine Intelligence, June 1989). Depending on the domain, any number of possible models can be fit to these points, including other types of splines, or any other transformation.

This global deformation map (transform) 940, 1040 is an approximation of the deformation of the pattern, with accuracy limited by whatever level of detail the provided feature points or regions possess, and limited by the appropriateness of the chosen transformation (e.g., perspective, cylinder, or spline) for modeling that deformation.

The global deformation map of the invention can be used to un-do or otherwise reverse the deformation of the deformed pattern so as to provide an un-deformed pattern.

Other variants and embodiments will occur to those skilled in the art, without departing from the spirit and scope of the invention. Accordingly, the invention is not intended to be limited by the detailed description, except as set forth in the following claims.

The invention claimed is:

1. A method for characterizing a deformed pattern in a single image, the method comprising:
    providing a plurality of 2D features that represent the deformed pattern in the image, the 2D features include edge information;
    dividing the plurality of 2D features into a plurality of sub-pluralities, wherein the sub-pluralities represent respective sub-patterns in the image, the sub-pattern having more than one 2D feature, a plurality of the sub-patterns are spatially coherent representing the deformed pattern;
    locating a first sub-pattern in the image so as to provide a first sub-pattern location; locating a second sub-pattern in the image so as to provide a second sub-pattern location; and
    using the first sub-pattern location and the second sub-pattern location and a processor for determining a deformation mapping that characterizes a deformation of the deformed pattern in the image.

2. The method of claim 1, wherein the locating the sub-patterns in over at least one of translation, rotation, x-scale, and y-scale.

3. A method for characterizing a deformed pattern in an image, the method comprising:
    dividing the deformed pattern into at least a first sub-pattern and a second sub-pattern, the sub-patterns are spatially coherent and having more than one 2D feature, where the 2D features include edge information;
    locating the first sub-pattern in the image so as to provide a first sub-pattern pose; locating the second sub-pattern in the image so as to provide a second sub-pattern pose; and
    using a transform to fit the first sub-pattern pose and the second sub-pattern pose using a processor for determining a deformation mapping that characterizes a deformation of the deformed pattern in the image.

4. The method of claim 3, wherein the first sub-pattern and second sub-pattern each include a region.

5. A method for characterizing a deformed pattern in an image, the method comprising:
    dividing the deformed pattern into at least a first sub-pattern and a second sub-pattern, the sub-patterns are spatially coherent and having more than one 2D feature, where the 2D features include edge information; locating the first sub-pattern in an image so as to provide a first sub-pattern pose;
    locating the second sub-pattern in the image so as to provide a second sub-pattern pose;
    deriving a plurality of source points from the first sub-pattern and a plurality of source points from the second sub-pattern;
    generating, using a processor, a plurality of destination points from the source points and the sub-pattern poses; and
    using a transform to fit the plurality of source points and the plurality of destination points using the processor so as to create a global deformation map that characterizes a deformation of the deformed pattern in the image.

6. The method of claim 1, wherein the transform is a perspective transform.

7. The method of claim 1, wherein the transform is an affine transform.

8. The method of claim 1, wherein the transform is a spline transform.

9. The method of claim 1, wherein the transform is a thin-plate spline transform.

10. The method of claim 1, wherein the transform is a cylinder transform.

11. The method of claim 1, wherein the transform is fit using a least-squares-fit method.

12. The method of claim 1, wherein the transform is fit using a Total Variation method.

13. The method of claim 1, wherein the transform is fit using a Robust M-estimators method.

14. The method of claim 1, wherein the transform is fit using a Minimum $L_p$-Norm Estimation.

15. The method of claim 1, wherein the transform is fit using a Least Median Squares method.

16. The method of claim 5, wherein deriving a plurality of source points from the first sub-pattern and a plurality of source points from the second sub-pattern includes:
    representing each sub-pattern as a region having a boundary and an interior area;
    selecting at least one interior point.

17. The method of claim 5, wherein deriving a plurality of source points from the first sub-pattern and a plurality of source points from the second sub-pattern includes:

representing each sub-pattern as a region having a boundary and an interior area;

selecting a plurality of boundary points along the boundary.

18. The method of claim 17, wherein the boundary points include corners.

19. The method of claim 17, wherein the boundary points include a point midway between two vertices of the boundary.

20. The method of claim 5, wherein deriving a plurality of source points from the first sub-pattern and a plurality of source points from the second sub-pattern includes:

representing each sub-pattern as a plurality of feature points; and sub-sampling the plurality of feature points so as to reduce the number of feature points in each sub-pattern.

21. The method of claim 5, wherein deriving a plurality of source points from the first sub-pattern and a plurality of source points from the second sub-pattern includes:

representing sub-patterns as regions, the region having a boundary and an interior area;

selecting a plurality of boundary points along the boundary.

\* \* \* \* \*